(12) United States Patent
Kondo et al.

(10) Patent No.: US 7,680,006 B2
(45) Date of Patent: Mar. 16, 2010

(54) APPARATUS AND METHOD FOR PRODUCING OPTICAL RECORDING MEDIUM, OPTICAL RECORDING MEDIUM, APPARATUS AND METHOD FOR REPRODUCTION AND APPARATUS AND METHOD FOR RECORDING

(75) Inventors: Tetsujiro Kondo, Tokyo (JP); Norifumi Yoshiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 11/893,208

(22) Filed: Aug. 15, 2007

(65) Prior Publication Data
US 2008/0247286 A1 Oct. 9, 2008

Related U.S. Application Data

(62) Division of application No. 10/482,348, filed as application No. PCT/JP03/05472 on Apr. 28, 2003, now Pat. No. 7,328,447.

(30) Foreign Application Priority Data
Apr. 30, 2002 (JP) .......................... P2002-129303

(51) Int. Cl.
G11B 7/00 (2006.01)
G11B 7/24 (2006.01)

(52) U.S. Cl. .................. 369/53.2; 369/47.1; 369/94; 369/275.1; 369/283

(58) Field of Classification Search ....................... None
See application file for complete search history.

(56) References Cited

U.S. PATENT DOCUMENTS 6,797,090 B2 * 9/2004 Yang et al. ..................... 156/74
6,970,409 B2 * 11/2005 Araki et al. ............... 369/53.24

FOREIGN PATENT DOCUMENTS

| JP | 8-339571 | 12/1996 |
| JP | 9-35327 | 2/1997 |
| JP | 9-305093 | 11/1997 |
| JP | 11-296902 | 10/1999 |
| JP | 2001-14725 | 1/2001 |

* cited by examiner

Primary Examiner—Muhammad N. Edun
(74) Attorney, Agent, or Firm—Frommer Lawrence & Haug LLP; William S. Frommer

(57) ABSTRACT

An optical recording medium having a plural number of recording layers includes a n-th recording layer (23) (n≧1), made up by a substrate (20) and a semi-reflective layer (21) carried by the substrate (20) and adapted for partially reflecting and partially transmitting the incident light, a (n+1)th recording layer (28), made up by another substrate (25) and a reflecting layer (26) carried by the substrate (25) and adapted for reflecting the incident light, and a light condensing layer (24) for condensing the light incident via the n-th recording layer (23) on the (n+1)th recording layer (28).

3 Claims, 15 Drawing Sheets

REPRODUCING LIGHT

APPARATUS AND METHOD FOR PRODUCING OPTICAL RECORDING MEDIUM, OPTICAL RECORDING MEDIUM, APPARATUS AND METHOD FOR REPRODUCTION AND APPARATUS AND METHOD FOR RECORDING

This is a division of application Ser. No. 10/482,348, filed Aug. 12, 2004, now U.S. Pat. No. 7,328,447, pursuant to 35 USC 371 from International Application PCT/JP03/05472, filed Apr. 28, 2003, which is entitled to the priority filing date of Japanese application 2002-129303, filed in Japan on Apr. 30, 2002, the entirety of which is incorporated herein by reference.

TECHNICAL FIELD

This invention relates to an apparatus and a method for manufacturing an optical recording medium having plural recording layers, an optical recording medium, an apparatus and a method for recording the information on the optical recording medium, and an apparatus and a method for reproducing the information from the optical recording medium.

This application claims priority of Japanese Patent Application No. 2002-129303, filed in Japan on Apr. 30, 2002, the entirety of which is incorporated by reference herein.

BACKGROUND ART

The conventional recording medium, such as an optical disc, is mostly formed by a sole recording layer. Recently, a recording medium having plural recording layers, stacked together, within the disc, has made its debut. In reproducing the optical disc, having plural recording layers, such a method is used that consists in reading out data from one recording layer to another (see for example the Japanese Laid-pen Patent Publication No. 2003-59091).

However, the optical disc, having multiple recording layers, is aimed to improve the recording capacity, and simply data is recorded in each recording layer. Thus, in reproducing the optical disc, data is reproduced from one recording layer to another.

DISCLOSURE OF THE INVENTION

In view of the above described status of the art, it is an object of the present invention to provide an optical recording medium in which main data and supplementary data may be recorded in the perpendicular direction of the plural recording layers, an apparatus and a method for manufacturing the optical recording medium, an apparatus and a method for recording data on the optical recording medium, and an apparatus and a method for reproducing data from the optical recording medium.

For accomplishing the above object, the present invention provides an optical recording medium manufacturing apparatus for manufacturing an optical recording medium having a plurality of recording layers, in which the apparatus comprises first producing means for producing a n-th ($n \geq 1$) recording layer at least having a semi-reflective layer for reflecting and transmitting the incident light, formed on a substrate, second producing means for producing a (n+1)th recording layer at least having a substrate and a reflecting layer for reflecting the light, incident thereon, formed on the substrate, third producing means for producing a light condensing layer for collecting the light, incident thereon, and fourth producing means for bonding the n-th recording layer, produced by the first producing means, the light condensing layer, produced by the third producing means, and the (n+1)th recording layer, produced by the second producing means, in this order.

The present invention provides an optical recording medium manufacturing apparatus for manufacturing an optical recording medium having a plurality of recording layers, in which the apparatus comprises first producing means for producing a n-th recording layer at least having a substrate and a semi-reflective layer for partially reflecting and partially transmitting the incident light, formed on the substrate, second producing means for producing a (n+1)th recording layer at least having another substrate and a reflecting layer for reflecting the light, incident thereon, formed on the another substrate, and third producing means for producing, on the n-th recording layer produced by the first producing means, a light condensing layer for collecting the light incident through the n-th recording layer on the (n+1)th recording layer.

The present invention also provides an optical recording medium manufacturing apparatus for manufacturing an optical recording medium having a plurality of recording layers, in which the apparatus comprises first producing means for producing a n-th ($n \geq 1$) recording layer at least having a substrate and a semi-reflective layer for reflecting and transmitting the incident light, formed on the substrate, second producing means for producing a (n+1)th recording layer at least having another substrate and a reflecting layer for reflecting the light, incident thereon, formed on the another substrate, and third producing means for producing, on the (n+1)th recording layer produced by the second producing means, a light condensing layer for collecting the light incident through the n-th recording layer on the (n+1)th recording layer.

The present invention also provides an optical recording medium manufacturing method for manufacturing an optical recording medium having a plurality of recording layers, in which the method comprises a first producing step of producing a n-th ($n \geq 1$) recording layer at least having a semi-reflective layer for partially reflecting and partially transmitting the incident light, formed on a substrate, a second producing step of producing a (n+1)th recording layer at least having another substrate and a reflecting layer for reflecting the incident light, formed on the another substrate, a third producing step of producing a light condensing layer for collecting the light, incident thereon, and a fourth producing step of bonding the n-th recording layer, produced by the first producing step, the light condensing layer, produced by the third producing step, and the (n+1)th recording layer, produced by the second producing step, in this order.

The present invention also provides an optical recording medium manufacturing method for manufacturing an optical recording medium having a plurality of recording layers, in which the method comprises a first producing step of producing a n-th ($n \geq 1$) recording layer at least having a substrate and a semi-reflective layer for partially reflecting and partially transmitting the incident light, formed on the substrate, a second producing step of producing a (n+1)th recording layer at least having another substrate and a reflecting layer for reflecting the light, incident thereon, formed on the another substrate, and a third producing step of producing, on the n-th recording layer produced by the first producing step, a light condensing layer for collecting the light incident through the n-th recording layer on the (n+1)th recording layer.

The present invention also provides an optical recording medium manufacturing method for manufacturing an optical recording medium having a plurality of recording layers, in which the method comprises a first producing step of producing a n-th recording layer at least having a substrate and a semi-reflective layer for reflecting and transmitting the incident light, formed on the substrate, a second producing step of producing a (n+1)th recording layer at least having another substrate and a reflecting layer for reflecting the light, incident thereon, formed on the another substrate, and a third producing step of producing, on the (n+1)th recording layer produced by the second producing step, a light-condensing layer for collecting the light incident through the n-th recording layer on the (n+1)th recording layer.

The present invention also provides an optical recording medium having a plurality of recording layers, comprising a n-th (n≧1) recording layer at least having a substrate and a semi-reflective layer for partially reflecting and partially transmitting the incident light, formed on the substrate, a (n+1)th recording layer at least having another substrate and a reflecting layer for reflecting the light, incident thereon, formed on the another substrate, and a light condensing layer for collecting the light incident through the n-th recording layer on the (n+1)th recording layer.

The present invention also provides a reproducing apparatus comprising reproducing light illuminating means for illuminating reproducing light on an optical recording medium having a plurality of recording layers, and light detection means for detecting the light which is the reproducing light illuminated by the reproducing light illuminating means, the reproducing light then being incident on the optical recording medium so as to be then reflected back responsive to the incidence. The optical recording medium includes a n-th (n≧1) recording layer at least having a substrate and a semi-reflective layer for reflecting and transmitting the incident light, formed on the substrate, a (n+1)th recording layer at least having another substrate and a reflecting layer for reflecting the light, incident thereon, formed on the another substrate, and a light condensing layer for collecting the light incident through the n-th recording layer on the (n+1)th recording layer. The light detection means detects the superimposed light composed of the light, which is the reproducing light illuminated by the reproducing light illuminating means and incident on the n-th recording layer of the optical recording medium so as to be reflected back from the semi-reflective layer, and light transmitted through the semi-reflective layer and collected by the light condensing layer to fall on the (n+1)th layer so as to be then reflected by the reflecting layer.

The present invention also provides a reproducing method including: illuminating reproducing light on an optical recording medium having a plurality of recording layers, the optical recording medium including a n-th (n≧1) recording layer at least having a substrate and a semi-reflective layer for partially reflecting and partially transmitting the incident light, formed on the substrate, a (n+1)th recording layer at least having another substrate and a reflecting layer for reflecting the light, incident thereon, formed on the another substrate, and a light condensing layer for collecting the light incident through the n-th recording layer on the (n+1)th recording layer, and detecting the superposed light composed of the light which is the incident reproducing light reflected by the semi-reflective layer owned by the n-th recording layer and the light transmitted through the semi-reflective layer, condensed by the light condensing layer and reflected by the reflecting layer owned by the (n+1)th recording layer.

The present invention also provides a recording apparatus comprising recording light illuminating means for illuminating recording light on an optical recording medium having a plurality of recording layers. The optical recording medium includes a n-th (n≧1) recording layer at least having a substrate and a semi-reflective layer for partially reflecting and partially transmitting the incident light, formed on the substrate, a (n+1)th recording layer at least having another substrate and a reflecting layer for reflecting the light, incident thereon, formed on the another substrate, and a light condensing layer for collecting the light incident through the n-th recording layer on the (n+1)th recording layer. The n-th recording layer includes an organic dye material, carried by the substrate, and adapted for being changed responsive to a preset heat quantity, while the (n+1)th recording layer includes an organic dye material, carried by the another substrate, and adapted for being changed responsive to a heat quantity different than the preset heat quantity. The recording apparatus also comprises an objective lens for condensing the recording light illuminated by the recording light illuminating means on the optical recording medium, and focusing control means for controlling the focusing of the objective lens. In recording data on the n-th recording layer of the recording medium, the focusing control means controls the focusing position of the objective lens so that the light will be focused on the organic dye material formed on the n-th recording layer. In recording data on the (n+1)th recording layer of the recording medium, the focusing control means controls the focusing position of the objective lens so that the light will be focused on the organic dye material formed on the (n+1)th recording layer through the light condensing layer.

The present invention also provides a recording method for recording data on an optical recording medium having a plurality of recording layers, the optical recording medium at least having an n-th recording layer (n≧1), made up by a substrate and a semi-reflective layer carried by the substrate and adapted for partially reflecting and partially transmitting the light incident thereon, a (n+1)th recording layer, made up by another substrate and a reflective layer for reflecting the light incident thereon, and a light condensing layer for condensing the light incident via the n-th recording layer on the (n+1)th recording layer. The n-th recording layer includes an organic dye material, carried by the substrate, and adapted for being changed responsive to a preset heat quantity, while the (n+1)th recording layer includes an organic dye material, carried by the another substrate, and adapted for being changed responsive to a heat quantity different than the preset heat quantity. When data is recorded on the n-th recording layer of the optical recording medium, the focusing position of the objective lens is controlled so that the light will be focused on the organic dye material formed on the n-th recording layer. When data is recorded on the (n+1)th recording layer of the optical recording medium, the focusing position of the objective lens is controlled so that the light will be focused on the organic dye material formed on the (n+1)th recording layer.

BEST MODE FOR CARRYING OUT THE INVENTION

Figure 1:
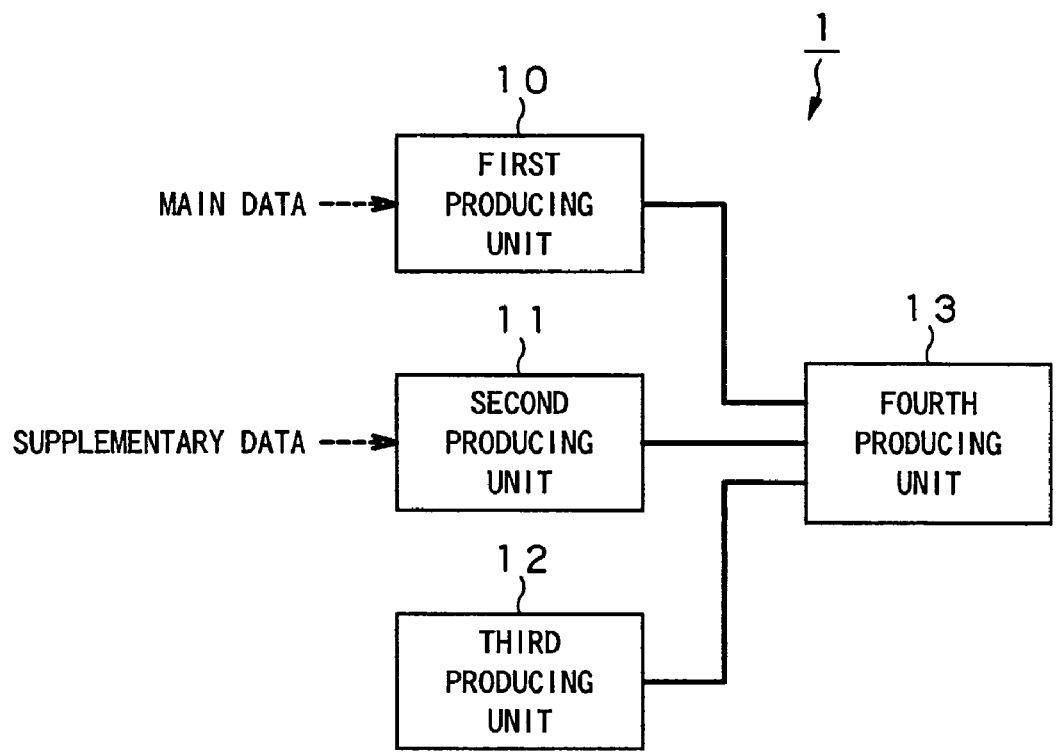
FIG. 1 is a block diagram showing a first illustrative structure of an optical disc manufacturing apparatus according to the present invention.
Figure 2:
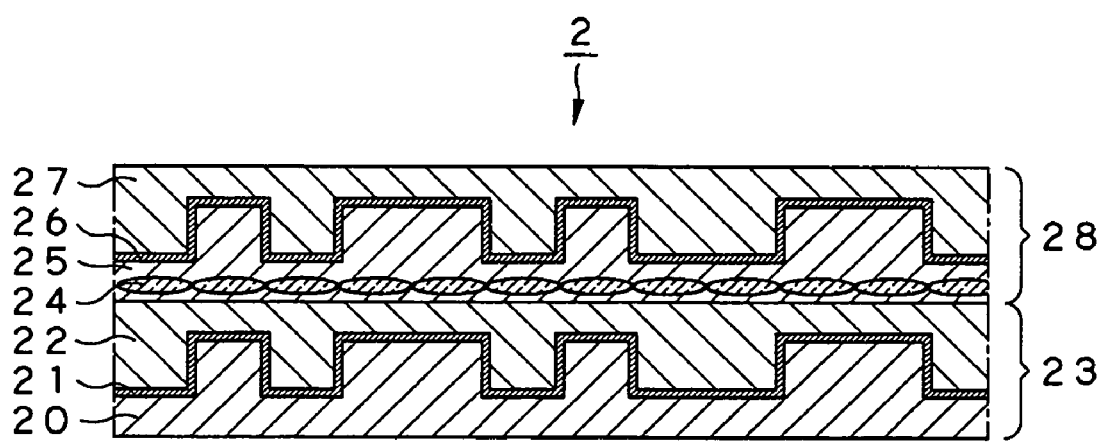
FIG. 2 is a cross-sectional view showing an illustrative structure of an optical disc according to the present invention.

The present invention is applied to, for example, an optical disc 2, having a plural number of recording layers, and which is manufactured by an optical disc manufacturing apparatus 1, shown in FIG. 1. Referring to FIG. 2, the optical disc 2 is made up by a n-th recording layer 23 ($n \geq 1$), hereinafter referred to as a first recording layer, and a (n+1)th recording layer 28, hereinafter referred to as a second recording layer. The first recording layer 23 is made up by a substrate 20, having formed thereon a preset recording pattern, a semi-reflective layer 21, partially reflecting and partially transmitting the incident light, and a protective layer 22 for protecting the semi-reflective layer 21. The second recording layer 28 is made up by a light condensing layer 24 (hereinafter referred to as a lens layer) for collecting the light transmitted through the first recording layer 23, a substrate 25, having formed thereon a preset recording pattern, correlated with the recording pattern formed on the substrate 20, a reflective layer 26 for reflecting the incident light, and a protective layer 27 for protecting the reflective layer 26. The structure of the optical disc manufacturing apparatus 1 for manufacturing the optical disc 2 is now explained.

Referring to FIG. 1, the optical disc manufacturing apparatus 1 includes a first producing unit 10 for producing the first recording layer 23, which is comprised of the semi-reflective layer 21, partially reflecting and partially transmitting the incident light, the protective layer 22 for protecting the semi-reflective layer 21 and the substrate 20 having formed thereon the semi-reflective layer 21 and the protective layer 22. The optical disc manufacturing apparatus also includes a second producing unit 11 for producing the second recording layer 28, which is comprised of the reflective layer 26, reflecting the incident light, the protective layer 27, protecting the reflective layer 26, and substrate 25 having formed thereon the reflective layer 26 and the protective layer 27. The optical disc manufacturing apparatus also includes a third producing unit 12 for forming the lens layer 24 for condensing the incident light, and a fourth producing unit 13, for bonding the first recording layer 23, produced by the first producing unit 10, the lens layer 24, produced by the third producing unit 12 and the second recording layer 28, produced by the second producing unit 11, in this order.

The specified producing method for producing the first recording layer 23 by the first producing unit 10 is now explained. Meanwhile, the first producing unit 10 forms a recording pattern, derived from the main data, on the substrate 20.

Figure 3A:
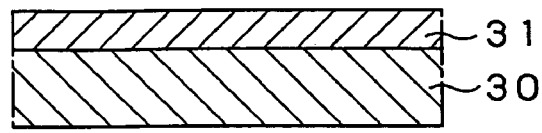
FIGS. 3A to 3G show the process steps for manufacturing an optical disc by the optical disc manufacturing apparatus shown in FIG. 1.
Figure 3B:
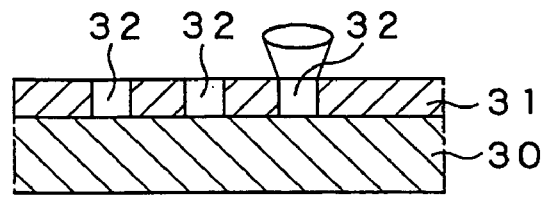

In a step 1, shown in FIG. 3A, a photoresist film is formed to a preset film thickness on a glass master disc 30. A tight bonding agent is applied to a space between the glass master disc 30 and a photoresist film 31 for improving the bonding power between the glass master disc 30 and the photoresist film 31. The method then proceeds to a step 2 shown in FIG. 3B. In the step 2, shown in FIG. 3B, the glass master disc 30, carrying the photoresist film 31 thereon, is mounted on a turntable of a cutting machine and illuminated by laser light modulated by main data to be recorded to expose the photoresist film 31 to the laser light to form a light exposed area 32. The method then proceeds to a step 3 shown in FIG. 3C.

Figure 3C:
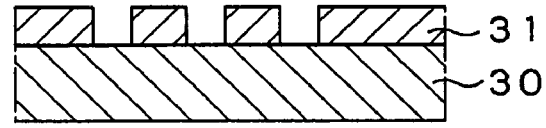
Figure 3D:
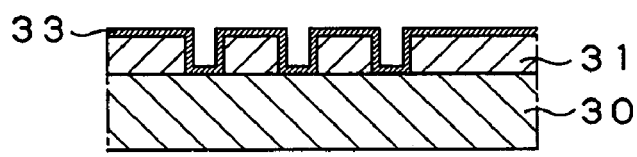

In the step 3, shown in FIG. 3C, the photoresist film 31 is developed with a developing solution. This development process removes the photoresist film 3 'of the light exposed' area 32 to form a resist pattern on the glass master disc 30. The method then proceeds to a step S4 shown in FIG. 3D. In the step 4, shown in FIG. 3D, the glass master disc 30 is set on a sputtering device, and an electrically conductive film 33 of e.g. nickel is formed on the resist pattern surface. The method then proceeds to a step 5 shown in FIG. 3E.

Figure 3E:
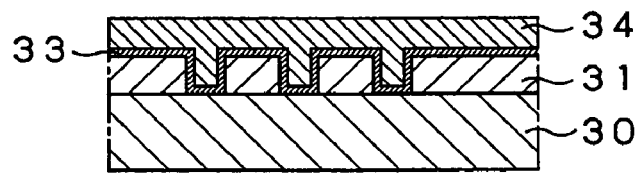
Figure 3F:
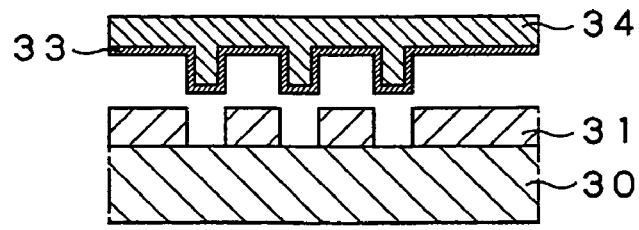

In the step 5, shown in FIG. 3E, the glass master disc 30 is set in a plating unit for electroforming by nickel typing to deposit an electroformed layer 34 on the electrically conductive film 33. The method then proceeds to a step 6 shown in FIG. 3F. In the step 6, shown in FIG. 3F, the electroformed layer 34, having the resist pattern transcribed thereto, is peeled off from the glass master disc 30. The method then proceeds to a step 7 shown in FIG. 3G.

Figure 3G:
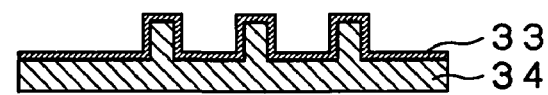

In the step 7, shown in FIG. 3G, the photoresist film 31, deposited to the electroformed layer 34, is removed, and the electroformed layer 34 is machined to a preset shape. A stamper is completed by the step 1 shown in FIG. 3A through the step 7 shown in FIG. 3G. By mounting the stamper to a metal die of an injection molding machine and pressing the stamper against the substrate 20, such as a substrate of resin, e.g. polycarbonate, a recording pattern corresponding to main data is formed on the substrate 20.

The first producing unit 10 forms the semi-reflective layer 21, partially reflecting and partially transmitting the incident light, on the substrate 20 having formed thereon a recording pattern based on main data as described above, and forms the protective layer 22 on the semi-reflective layer 21 to produce the first recording layer 23.

The method of forming the second recording layer 28 by the second producing unit 11 is similar to the above-described method and hence is not explained in detail. Meanwhile, the second producing unit 11 forms the recording pattern based on the supplementary data relevant to the main data (referred to below simply as supplementary data) and, for this reason, the laser light modulated in accordance with the supplementary data is illuminated, in the step 2 shown in FIG. 3B, to form a light exposed portion 32.

Figure 4:
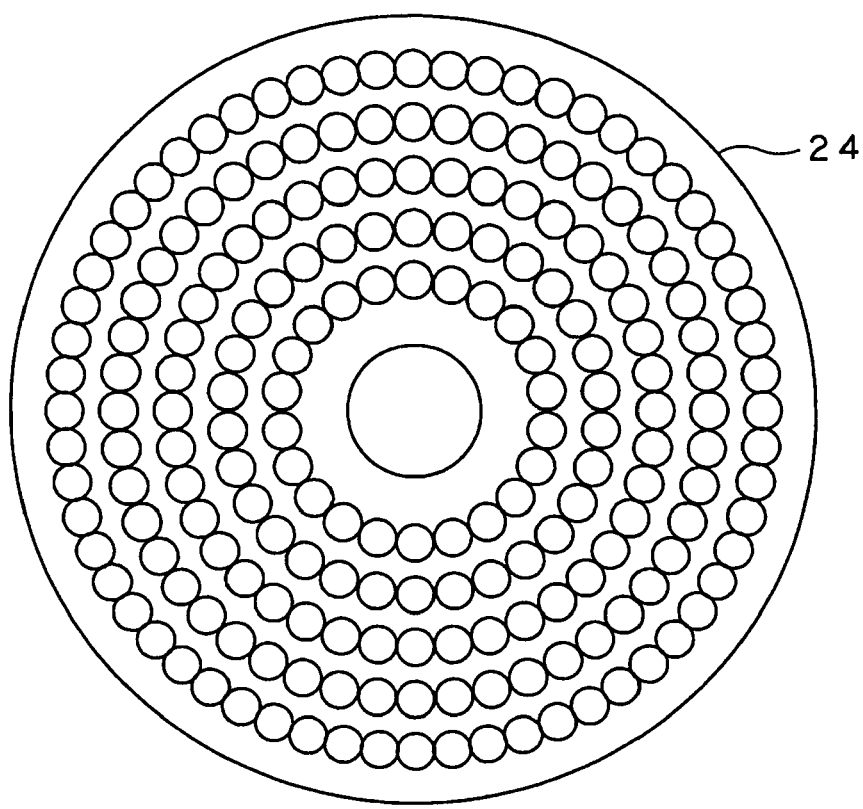
FIG. 4 is a top plan view showing a light condensing layer forming the optical disc according to the present invention.
Figure 5:
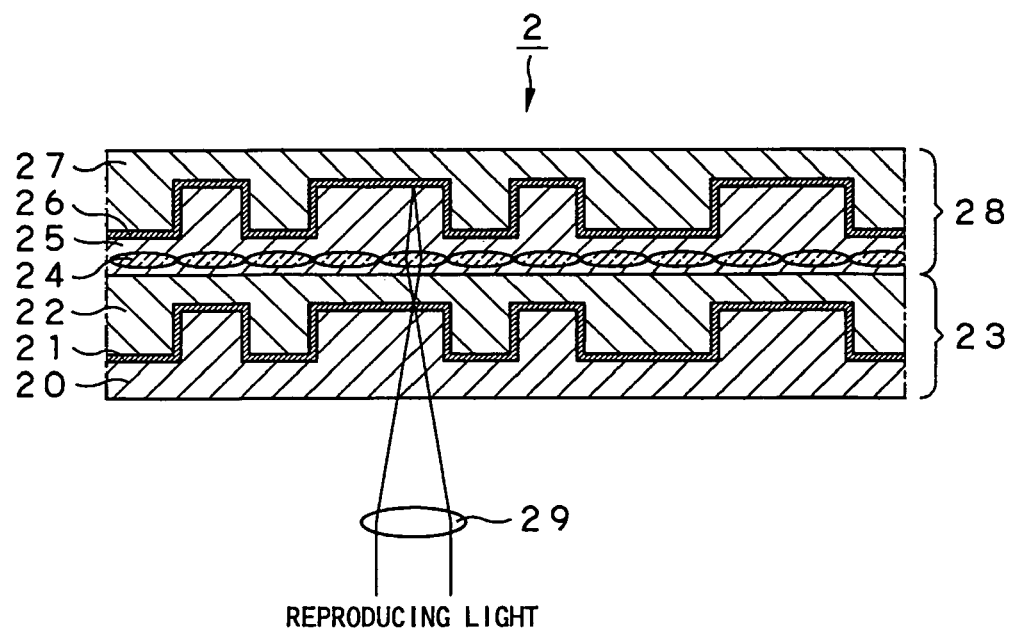
FIG. 5 is a schematic cross-sectional view showing how the reproducing light illuminated on the optical disc of the present invention forms a focal point thereon.

The method of producing the lens layer 24 by the third producing unit 12 is explained. The third producing unit 12 places a mask member, having a preset light condensing pattern formed thereon, on the substrate, and causes a light condensing material to be deposited on the substrate by a preset film-forming method, such as sputtering. The lens layer 24, thus produced, has a preset light condensing pattern formed on the entire substrate, as shown in FIG. 4.

The fourth producing unit 13 performs the processing of bonding the first recording layer 23, produced by the first producing unit 10, the lens layer 24, produced by the third producing unit 12, and the second recording layer 28 produced by the second producing unit 11, to one another.

With the optical disc manufacturing apparatus 1, constructed as described above, and including the first producing unit 10, for producing the first recording layer 23, the second producing unit 11 for producing the second recording layer 28, the third producing unit 12 for producing the lens layer 24 and the fourth producing unit 13 for bonding the first recording layer 23, second recording layer 28 and the lens layer 24 to one another, it is possible to produce an optical disc 2, including the first recording layer 23, having the main data recorded thereon and carrying the semi-reflective layer 21, the lens layer 24 and the second recording layer 28 having the supplementary data recorded thereon and carrying the reflective layer 26.

With the optical disc 2 according to the present invention, the light (reproducing light) incident on the optical disc 2 through an objective lens 29 is focused in the vicinity of the semi-reflective layer 21 and is thereby partially reflected and partially transmitted. The transmitted light beam is condensed by the lens layer 24 so as to be re-condensed in the vicinity of the reflective layer 26 formed on the second recording layer 28 and reflected. Thus, the light reflected by this optical disc 2 is the superimposed light made up by the light focused in the vicinity of the semi-reflective layer 21 and the reflected and the light re-focused in the vicinity of the reflective layer 26 and reflected, such that the supplementary data is superimposed on the main data. The conventional optical disc 2 does not have the lens layer for condensing the light transmitted through the first recording layer on the second recording layer and hence there is no possibility for the light transmitted through the semi-reflective layer to be re-focused on the second recording layer.

With the optical disc 2 of the present invention, main data, such as images or speech, are recorded on the first recording layer 23, while the supplementary data for raising the quality of the main data are recorded on the second recording layer 28. If the reproducing light is illuminated on such optical disc 2, the reflected light, composed of the reflected light from the first recording layer 23 and the reflected light from the second recording layer 28, superposed one on the other, is detected, and the so detected light is reproduced, it is possible to reproduce the main data improved in quality by the supplementary data.

Figure 6:
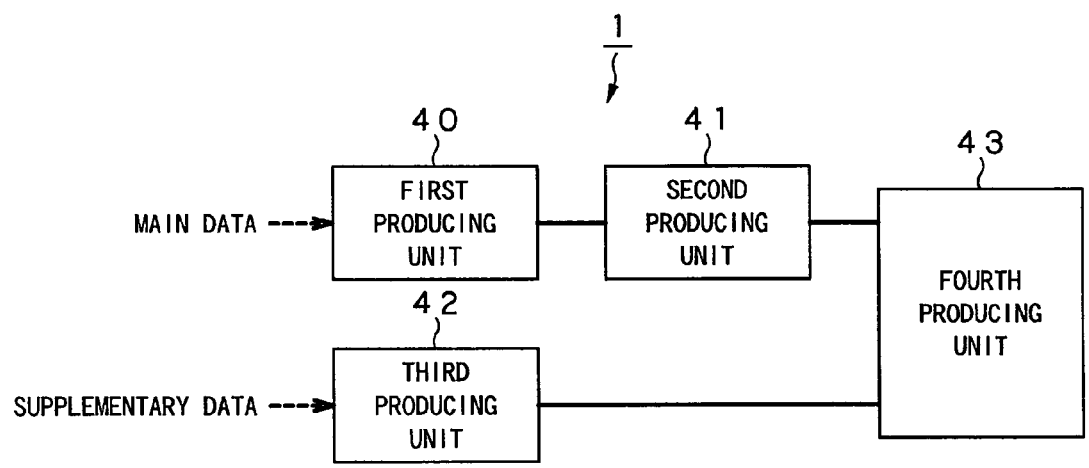
FIG. 6 is a block diagram showing a second illustrative structure of the optical disc manufacturing apparatus according to the present invention.

Meanwhile, it is sufficient that the optical disc manufacturing apparatus 1 according to the present invention is able to manufacture the optical disc 2 having the structure shown in FIG. 2, such that the invention is not limited to the embodiment shown herein. That is, as shown in FIG. 6, the optical disc manufacturing apparatus 1 according to the present invention may be composed of a first producing unit 40 for forming the first recording layer 23, a second producing unit 41 for forming the lens layer 24 on the first recording layer 23, a third producing unit 42 for forming the second recording layer 28, and a fourth producing unit 43. The first recording layer 23 is comprised of the semi-reflective layer 21, partially reflecting and partially transmitting the incident light, the protective layer 22, protecting the semi-reflective layer 21, and the substrate, carrying the layers 21, 22 and having formed thereon the recording pattern corresponding to the main data. The lens layer 24 condenses the light transmitted through the first recording layer 23 formed by the first producing unit 40 on the second recording layer 28. The second recording layer 28 is comprised of the reflective layer 26 for reflecting the incident light, the protective layer 27 for protecting the reflective layer 26 and the substrate 25 carrying the layers 26, 27 and having recorded thereon the recording pattern corresponding to the supplementary data. The fourth producing unit 43 bonds the first recording layer 23 and the second recording layer 28 together.

Figure 7:
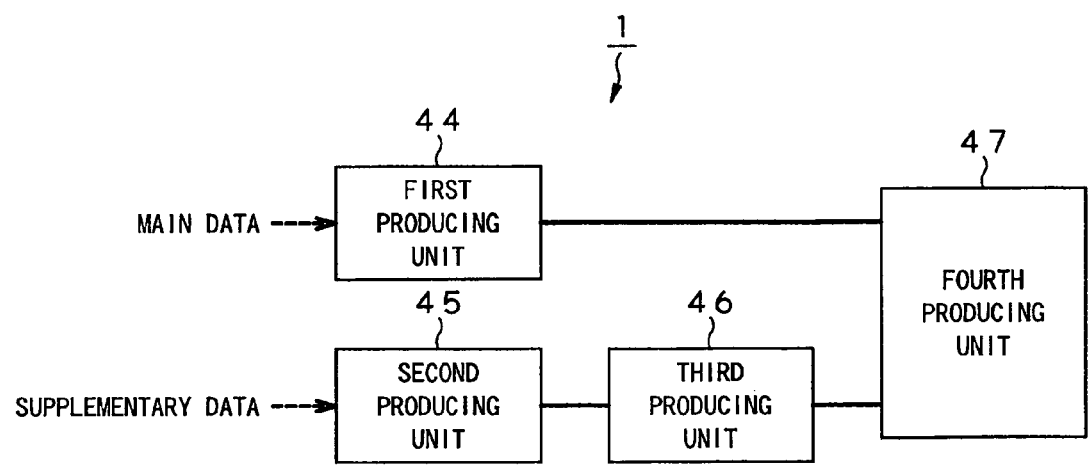
FIG. 7 is a block diagram showing a third illustrative structure of the optical disc manufacturing apparatus according to the present invention.

The optical disc manufacturing apparatus 1 according to the present invention may also be composed of a first producing unit 44 for forming the first recording layer 23, a second producing unit 45 for forming the second recording layer 28, a third producing unit 46 for forming the lens layer 24, and a fourth producing unit 47, as shown in FIG. 7. The first recording layer 23 is comprised of the semi-reflective layer 21, partially reflecting and partially transmitting the incident light, the protective layer 22, protecting the semi-reflective layer 21, and the substrate 20, carrying the layers 21, 22 and having formed thereon the recording pattern corresponding to the main data. The second recording layer 28 is comprised of the reflective layer 26, reflecting the incident light, the protective layer 27, protecting the reflective layer 26, and the substrate 25, carrying the layers 26, 27, and having formed thereon the recording pattern corresponding to the supplementary data. The lens layer 24 condenses the light, incident through the first recording layer 23, on the second recording layer 28. The fourth producing unit 47 bonds the first recording layer 23 and the second recording layer 28 to each other.

Figure 8:
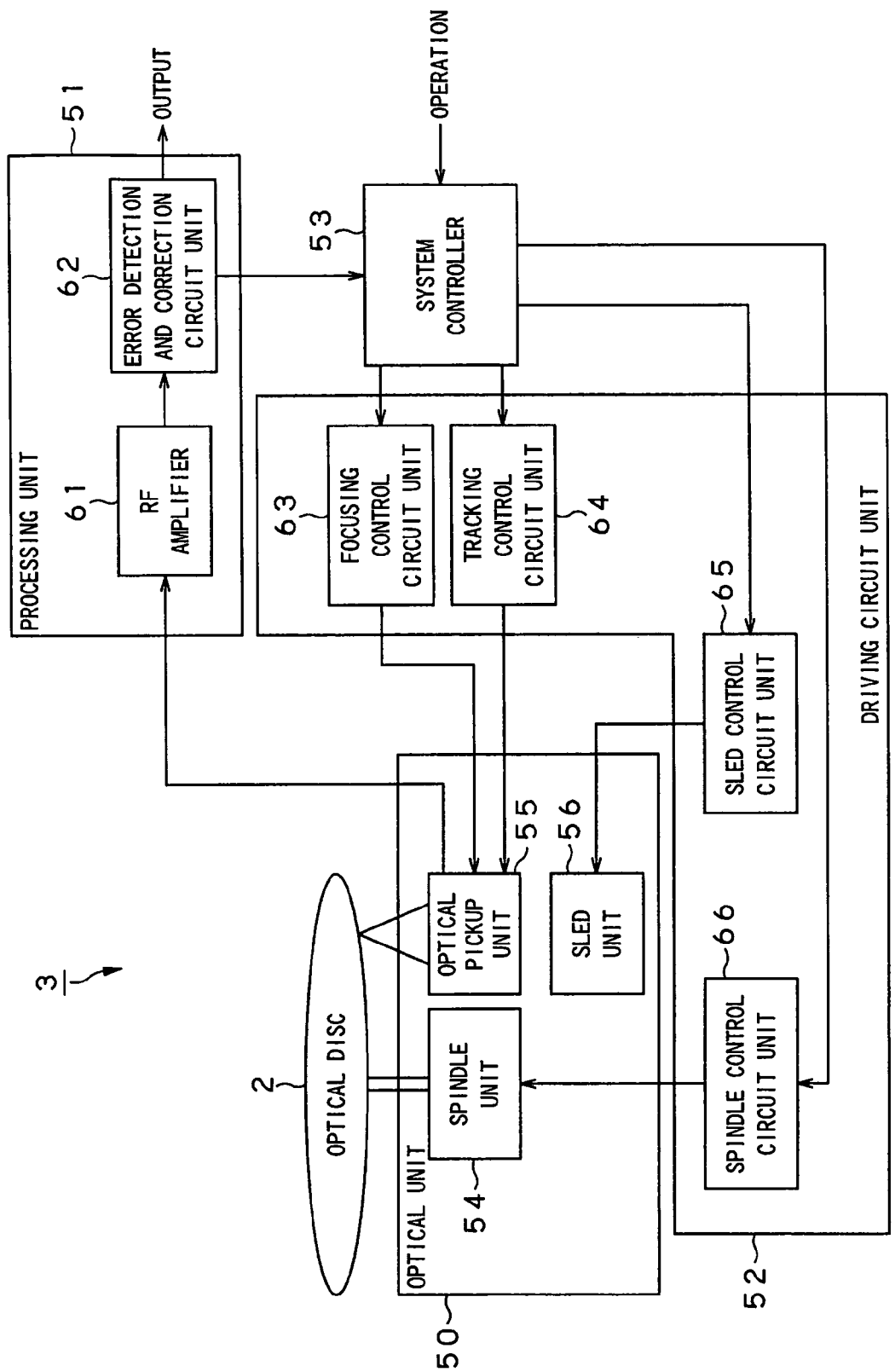
FIG. 8 is a block diagram showing the structure of an optical disc reproducing apparatus according to the present invention.

The method for reproducing data from the optical disc, manufactured as described above, is now explained. Referring to FIG. 8, an optical disc reproducing apparatus 3 for reading out data from the optical disc 2 includes an optical unit 50 for accessing the optical disc 2 to read out data therefrom, a processing unit 51 for performing preset processing on the data read out by the optical unit 50, a driving circuit unit 52 for driving the optical unit 50, and a system controller 53 for controlling the driving circuit unit 52 based on the data supplied from the processing unit 51.

Figure 9:
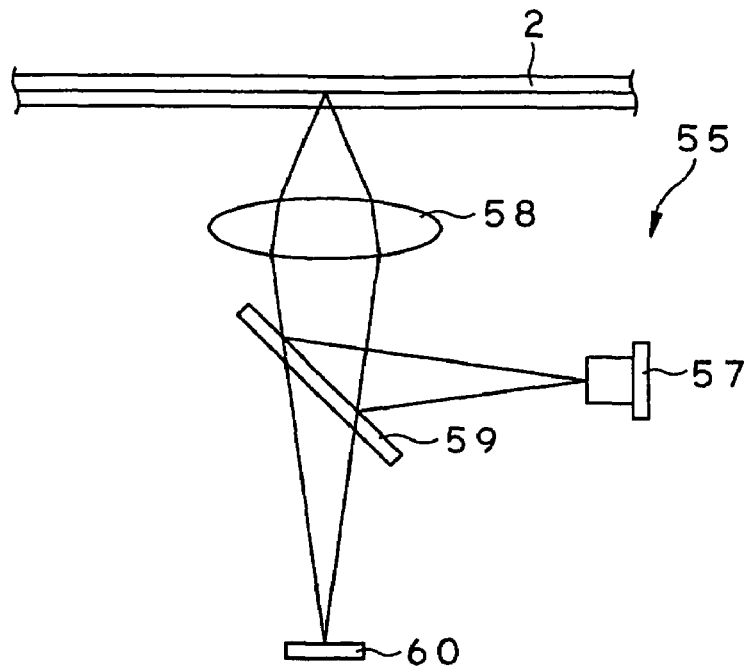
FIG. 9 is a block diagram showing the structure of an optical pickup unit provided to the optical disc reproducing apparatus shown in FIG. 8.

The optical unit 50 includes a spindle unit 54 for rotationally driving the optical disc 2, an optical pickup unit 55 for illuminating a reproducing light beam on the optical disc 2 to read out the light reflected therefrom, and a sled unit 56 for sled-driving the optical pickup unit 55. The optical pickup unit 55 includes a laser diode 57, as a light source, an objective lens 58 for condensing the light radiated from the laser diode 57 (reproducing light) on the optical disc 2, a beam splitter 59 for separating the reproducing light, radiated from the laser diode 57, and the return light, reflected back from the optical disc 2 (reflected light) from each other, and a photodetector 60 for receiving the reflected light from the optical disc 2 for detecting the signals, as shown in FIG. 9. These components are the same as those of the conventional optical pickup unit 55. However, an optical disc reproducing apparatus 3 according to the present invention differs from the conventional apparatus as to signal interpretation of the reflected light detected by the photodetector 60 which will be explained subsequently in detail. The optical pickup unit 55 is also provided with an optical system for illuminating the reproducing light through the objective lens 58 on the recording surface of the optical disc 2 and an optical system for directing the reflected light to the photodetector 60. The objective lens 58 is held for movement in the tracking direction (in an in-plan direction of the optical disc 2) and in the focusing direction (in the vertical direction to the optical disc 2) by a biaxial mechanism, not shown. Moreover, the optical pickup unit 55 is movable in the radial direction of the optical disc 2 by the sled unit 56.

The processing unit 51 includes an RF amplifier 61 for generating RF signals for reproduction, focusing error signals (referred to below as FE signals) and tracking error signals (referred to below as TE signals), etc., based on the reflected light supplied from the optical pickup unit 55 for generating RF signals for reproduction, and an error detection and correction circuit unit 62 for performing preset error detection and error correction on the reproducing RF signals supplied from the RF amplifier 61.

The system controller 53 controls the driving circuit unit 52 based on the signals supplied from the error detection and correction circuit unit 62.

The driving circuit unit 52 includes a focusing control circuit unit 63 for generating focusing driving signals, based on FE signals, supplied from the RF amplifier 61, and for supplying the focusing driving signals to the optical pickup unit 55, and a tracking control circuit unit 64 for generating tracking driving signals, based on TE signals supplied from the RF amplifier 61, and for supplying the tracking driving signals to the optical pickup unit 55. The driving circuit unit 52 also includes a sled control circuit unit 65 for generating sled driving signals, based on TE signals, supplied from the RF amplifier 61, and for supplying the sled driving signals to the sled unit 56, and a spindle control circuit unit 66 for generating spindle driving signals, based on the spindle error signals and spindle kick/brake signals, supplied from the system controller 53, and for supplying the spindle driving signals to the spindle unit 54.

Figure 10:
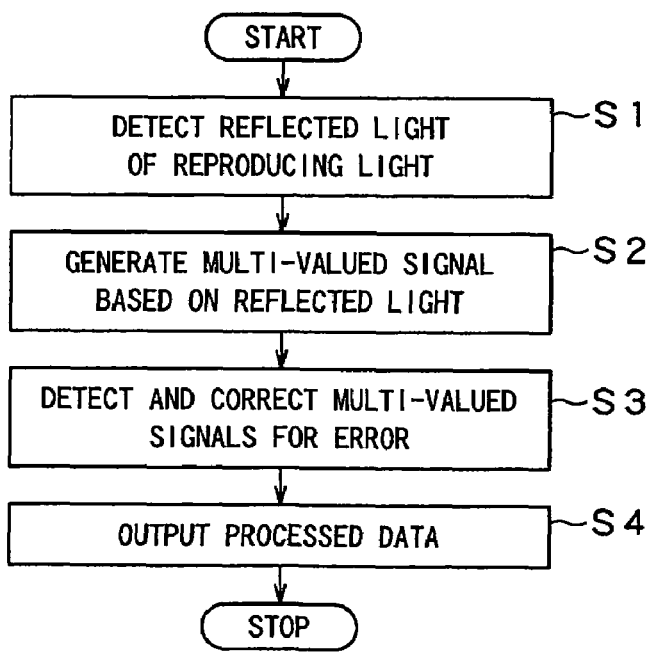
FIG. 10 is a flowchart showing the operation when data is reproduced from the optical disc by the optical disc reproducing apparatus shown in FIG. 8.

The operation of reproducing data from the optical disc 2 by the optical disc reproducing apparatus 3 according to the present invention is now explained by referring to the flowchart shown in FIG. 10. The optical unit 50, provided to the optical disc reproducing apparatus 3, illuminates the reproducing light on the optical disc 2 to detect the reflected light (step S1). The optical unit 50 generates multi-valued signals, based on the detected reflected light, to output the so generated signals to the processing unit 51 (step S2). The processing unit 51 detects and corrects errors in the input multi-valued signals (step S3) to output the as processed data to e.g. a loudspeaker (step S4).

The case in which the reproducing light is illuminated by the optical disc reproducing apparatus 3 for reproducing data recorded on the optical disc 2 and the case in which the reproducing light is illuminated by a conventional reproducing apparatus to reproduce data recorded on the conventional optical disc (the optical disc 2 of the present invention less the lens layer 24) are hereinafter explained.

Figure 11A:
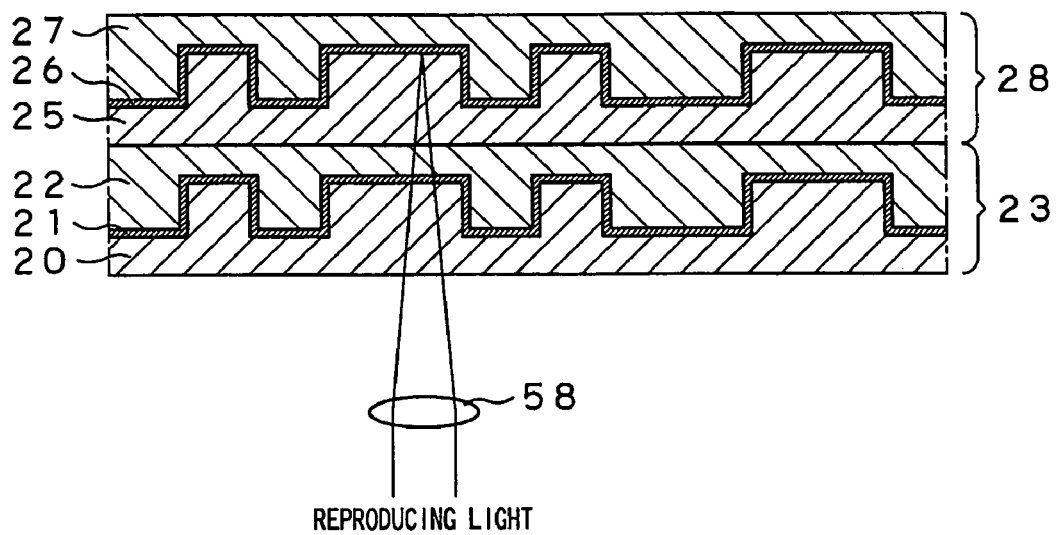
FIGS. 11A and 11B are a schematic cross-sectional view showing how a conventional optical disc is being reproduced by a conventional reproducing apparatus and a schematic cross-sectional view showing how the optical disc according to the present invention is being reproduced by the conventional reproducing apparatus.

When data is to be read out from a second recording layer formed on a conventional optical disc, the reproducing apparatus performs focusing control so that the optical disc is at a preset height from the optical disc surface. The reproducing light is then illuminated on the optical disc via the objective lens. The reproducing light is condensed by the objective lens and focused on the second recording layer, as shown in FIG. 11A. Thus, the reproducing apparatus performs preset focusing control on the objective lens to focus the light on a preset one of the recording layers formed on the optical disc to detect the light reflected therefrom to reproduce the data.

Figure 11B:
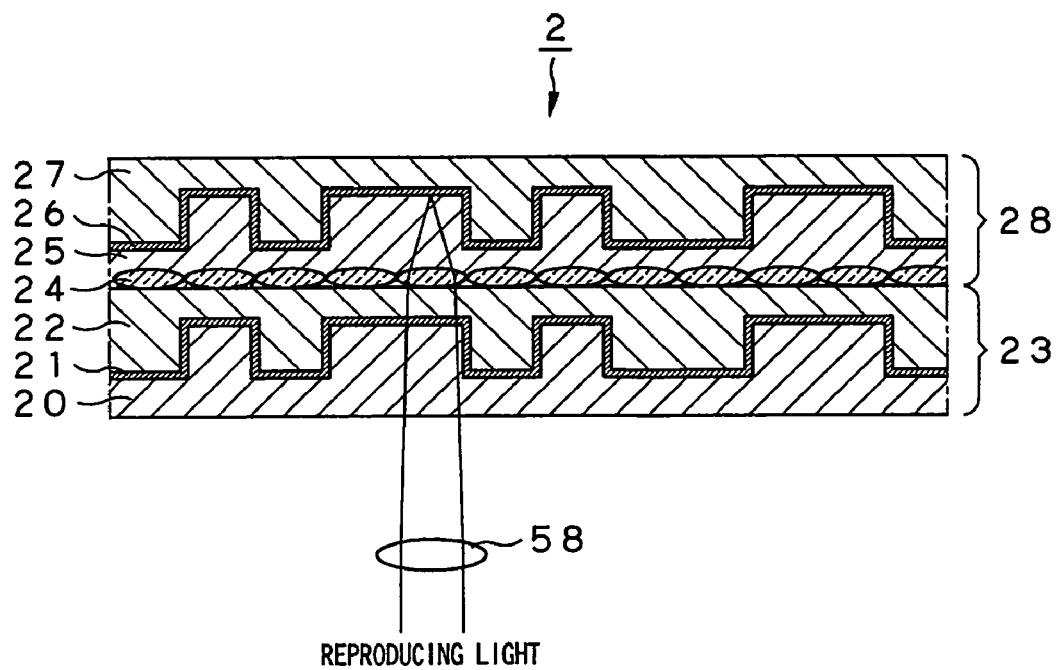

On the other hand, if, in reading out data from the second recording layer formed on the optical disc 2 of the present invention by the above-described reproducing apparatus, the objective lens is simply controlled as to focusing and the reproducing light is illuminated on the optical disc 2 via the objective lens, the reproducing light is modulated by the lens layer 24 provided between the first recording layer 23 and the second recording layer 28 and hence cannot be focused on the second recording layer, as shown in FIG. 11B. Thus, with the optical disc 2 of the present invention, provided with the lens layer 24, the information recorded on the second recording layer 28 cannot be accessed readily with the conventional reproducing apparatus. For example, if encrypted data is stored in the second recording layer 28, and the encrypted data is needed in order to read the data recorded on the first recording layer 23, the conventional reproducing apparatus is rendered unable to reproduce the data recorded on the optical disc 2 according to the present invention.

Figure 12:
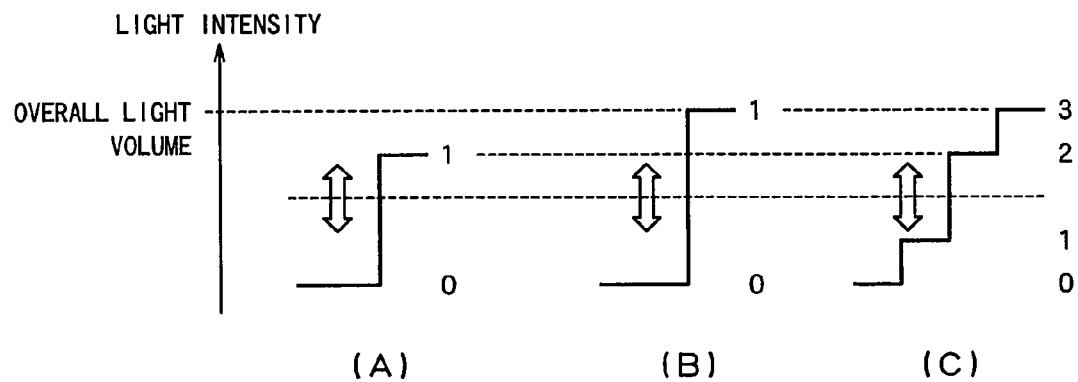
FIG. 12 schematically shows the concept of signal interpretation by a photodetector provided to the conventional reproducing apparatus.

The operation of the photodetector 60 provided to the optical disc reproducing apparatus 3 of the present invention (signal interpretation) and the operation of the photodetector provided to the conventional reproducing apparatus are hereinafter explained. First, the signal interpretation when the reproducing light is illuminated on the conventional optical disc and the reflected light therefrom is incident on the conventional photodetector 60 is explained with reference to FIG. 12. The conventional photodetector detects the light reflected from the first recording layer formed on the optical disc and takes the information as being a signal of 0 or 1, that is, as being the binary information, on the basis of a preset threshold value, as shown in FIG. 12(A). Moreover, the conventional photodetector detects the light, as the reproducing light illuminated on the preset focusing-controlled objective lens, and reflected back from the second recording layer formed on the optical disc, and takes the information as being a signal of 0 or 1, based on a preset threshold value, that is, as being the binary information, as shown in FIG. 12(B). Thus, with the conventional reproducing apparatus, the data recorded on the first recording layer and that recorded on the second recording layer are read out separately. Thus, the data recorded on the first recording layer and that recorded on the second recording layer are different data irrelevant from each other in the vertical direction, even though they are relevant to each other in the in-plane direction.

Figure 13:
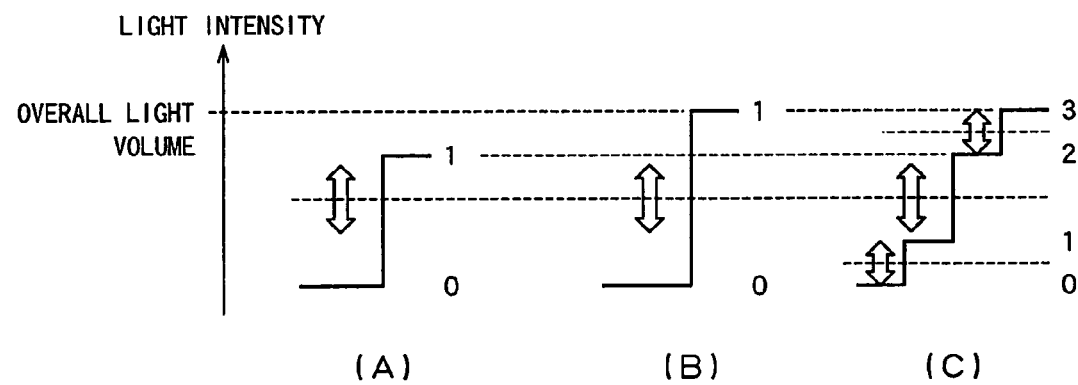
FIG. 13 schematically shows the concept of signal interpretation by a photodetector provided to the optical disc reproducing apparatus according to the present invention.

Conversely, when reading out data from the optical disc 2 according to the present invention, the photodetector 60 interprets the detected reflected light in four stages, as shown in FIG. 13(C). That is, the reflected light, returned back from the optical disc 2, is the superimposed light composed of light reflected back from the semi-reflective layer 21 (as shown in FIG. 13(A)) and the light reflected back from the reflective layer 26 (as shown in FIG. 13(B)). The photodetector 60 provided to the optical disc reproducing apparatus 3 according to the present invention is able to distinguish the difference in the intensity of the reflected light, and is able to interpret the reflected light by a signal with four values of from 0 to 3.

Meanwhile, the light incident on the second recording layer 28 is the light transmitted through the semi-reflective layer 21 of the first recording layer 23 and is lower in light intensity than the light incident on the first recording layer 23. Thus, the light reflected back from the reflective layer 26 is lower in light intensity than the reflected light from the semi-reflective layer 21.

That is, the light reflected back from the semi-reflective layer 21 in FIG. 13(C) is of the light intensity intermediate between 0 and 2, while the light reflected back from the reflective layer 26 is of the light intensity intermediate between 0 and 1 (or between 2 and 3).

The optical disc reproducing apparatus 3 according to the present invention includes the photodetector 60 which is able to perform signal interpretation with four values of from 0 to 3, depending on the difference in light intensity of the detected reflected light, in distinction from signal interpretation in two stages of 0 and 1 with the conventional photodetector. Thus, the optical disc reproducing apparatus 3 is able to distinguish data of a number of stages larger than two stages of signals possible with the conventional system.

The method of raising the quality of the main data by simultaneously reading out the main data recorded in the first recording layer 23 and the supplementary data recorded in the second recording layer 28 is hereinafter explained. Here, a case of obtaining an image of a high gradation of 16 bits as compared to the image of the conventional 8 bit gradation is taken as an example for explanation.

In the first recording layer 23, 8 bit image signals are recorded. In the second recording layer 28, upper 8 bit image signals, which will impart higher gradation to the 8 bit image signals, recoded in the first recording layer 23, are recorded. The signals recorded in the second recording layer 28, are relevant to the signals of the first recording layer 23, and describe the signals of the first recording layer 23 in further detail. When the image signals recorded in the second recording layer 28 are superimposed on the image signals recorded in the first recording layer 23, a smoother image with a higher gradation may be reproduced than if only the image signals recorded in the first recording layer 23 are reproduced.

If, with the conventional photodetector, the reproducing light is illuminated on the optical disc 2 and its reflected light is detected, only the 8 bit image signals, recorded in the first recording layer 23, are generated (with the conventional photodetector, the image signals on the first recording layer 23 can be read out, but the image signals of the second recording layer cannot be read out under the effect of the lens layer 24). Thus, the reproducing apparatus is unable to read out the image signals of the higher 8 bits, which impart higher gradation, and hence reproduces an image corresponding to 8 bit image signals of an ordinary image.

On the other hand, the photodetector 60 provided to the optical disc reproducing apparatus 3 is able not only to read out the information of the lower 8 bits, but is able to read out the information of the higher 8 bits, by four-valued interpretation, when the reproducing light is illuminated on the optical disc 2 and the reflected return light is detected, so that the high gradation 16 bit image may be produced. It should be noted that the reflected light, returned back from the optical disc 2, is the superimposed light composed of the light reflected back from the semi-reflective layer 21 and the light reflected back from the reflective layer 26, as shown in FIG. 13(C).

The above-described optical disc reproducing apparatus 3 includes an optical pickup unit 55 which illuminates the reproducing light on the optical disc 2. The optical disc 2 is comprised of the first recording layer 23, in the substrate 20 of which main data is recorded and the semi-reflective layer 21 of which partially reflects and partially transmits the incident light, the lens layer 24 for condensing the light transmitted through the first recording layer 23 to the second recording layer 28, and the second recording layer 28, the substrate of which carries the supplementary data and which reflects the incident light. The first recording layer 23, lens layer 24 and the second recording layer 28 are bonded to one another. The optical pickup unit 55 is able to detect the reflected light in a number of stages depending on the light intensity. Thus, the reproducing light incident on the first recording layer 23 and reflected back from the semi-reflective layer 21, and the light transmitted through the semi-reflective layer 21, condensed via the lens layer 24 on the second recording layer 28, and reflected back from the reflective layer 26, are superimposed one on the other, and interpreted in multiple stages, depending on the light intensities, so that the supplementary data recorded on the second recording layer 28 may be appended to and reproduced along with the main data recorded in the first recording layer 23.

Figure 14:
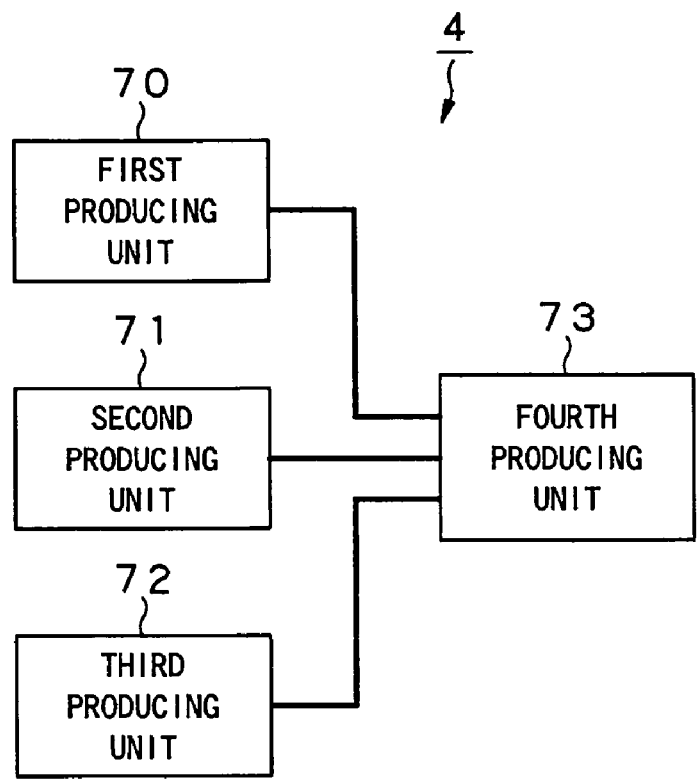
FIG. 14 is a block diagram showing a fourth illustrative structure of the optical disc according to the present invention.
Figure 15:
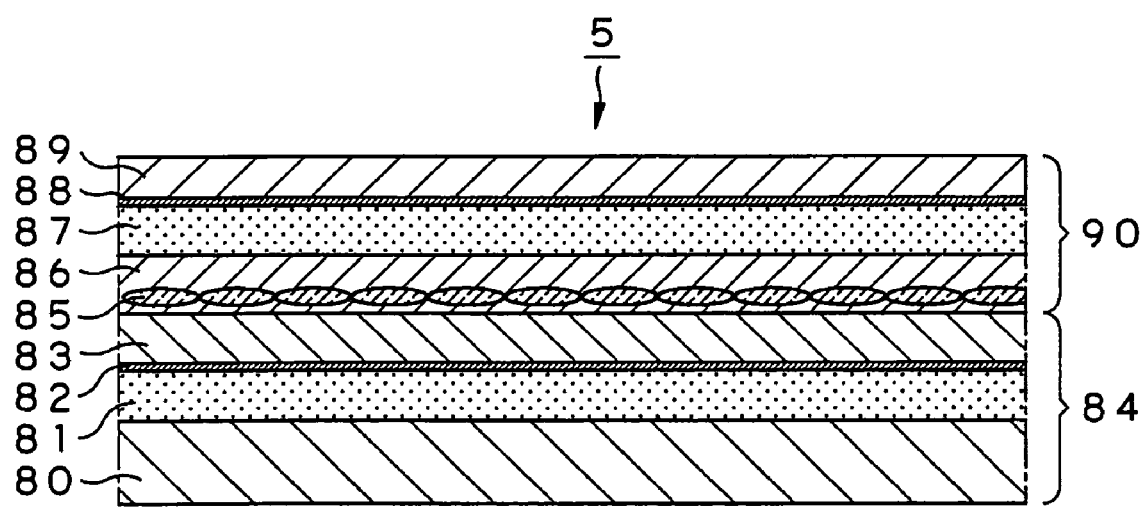
FIG. 15 is a cross-sectional view showing an illustrative structure of the optical disc according to the present invention.

The present invention may be applied to an optical disc 5 having plural recording layers and which may be manufactured by a optical disc manufacturing apparatus 4 as shown for example in FIG. 14. Referring to FIG. 15, the optical disc 5 is made up by a n-th recording layer 84 (n≧1) (hereinafter referred to as a first recording layer) and a (n+1)th recording layer 90 (hereinafter referred to as a second recording layer). The first recording layer is made up by a substrate 80, carrying a guide groove pattern, an organic dye layer 81, changed responsive to a preset heat quantity, a semi-reflective layer 82, partially reflecting and partially transmitting the incident light, and a protective layer 83 protecting the semi-reflective layer 82. The second recording layer 90 is made up by a light condensing layer 85 (hereinafter referred to as a lens layer) for condensing the light transmitted through the first recording layer 84, a substrate 86, carrying a guide grove pattern, an organic dye layer 87, changed with a heat quantity different from that of the organic dye layer 81, a reflective layer 88, reflecting the incident light, and a protective layer 89, protecting the reflective layer 88. The structure of the optical disc manufacturing apparatus 4 for manufacturing the optical disc 5 is now explained.

Referring to FIG. 14, the optical disc manufacturing apparatus 4 includes a first producing unit 70 for producing the first recording layer 84, which is comprised of the semi-reflective layer 82, partially reflecting and partially transmitting the incident light, and the protective layer 83 for protecting the semi-reflective layer 82, and the substrate 80 having formed thereon the semi-reflective layer 82 and the protective layer 83. The optical disc manufacturing apparatus also includes a second producing unit 71 for producing the second recording layer 90, which is comprised of the reflective layer 88, reflecting the incident light, and the protective layer 89, protecting the reflective layer 88, and the substrate 86 having formed thereon the reflective layer 88 and the protective layer 89. The optical disc manufacturing apparatus also includes a third producing unit 72 for producing a lens layer 85 for collecting the incident light, and a fourth producing unit 73, for bonding the first recording layer 84, produced by the first producing unit 70, the lens layer 85, produced by the third producing unit 72 and the second recording layer 90, produced by the second producing unit 71, in this order.

The specified method for producing the first recording layer 84 by the first producing unit 70 is hereinafter explained.

Figure 16A:
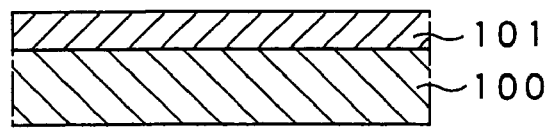
FIGS. 16A to 16G show the process steps for manufacturing an optical disc by the optical disc manufacturing apparatus shown in FIG. 14.
Figure 16B:
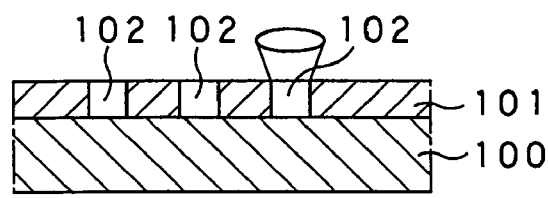

In a step 1 shown in FIG. 16A, a photoresist film 101 is formed to a preset film thickness on a glass master disc 100. A tight bonding agent is applied to a space between the glass master disc 100 and a photoresist film 101 for improving the bonding power between the glass master disc 100 and the photoresist film 101. The method then proceeds to a step 2 shown in FIG. 16B. In the step 2, shown in FIG. 16B, the glass master disc 100, carrying the photoresist film 101 thereon, is mounted on a turntable of a cutting machine and illuminated by laser light modulated by the guide groove to be formed to expose the photoresist film 101 to the laser light to form a light exposed area 102. The method then proceeds to a step 3 shown in FIG. 16C.

Figure 16C:
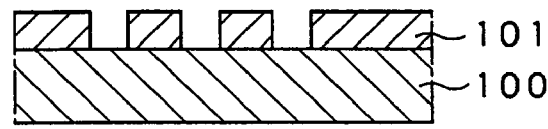
Figure 16D:
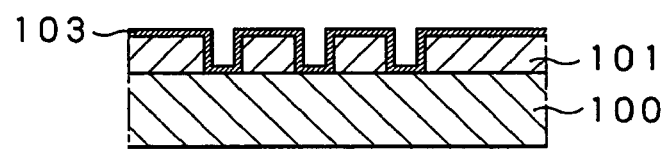

In the step 3, shown in FIG. 16C, the photoresist film 101 is developed with a developing solution. This development process removes the photoresist film 101 of the light exposed area 102 to form a resist pattern on the glass master disc 100. The method then proceeds to a step S4 shown in FIG. 16D. In the step 4, shown in FIG. 16D, the glass master disc 100 is set on a sputtering device, and an electrically conductive film 103 of e.g. nickel is formed on the resist pattern surface. The method then proceeds to a step 5 shown in FIG. 16E.

Figure 16E:
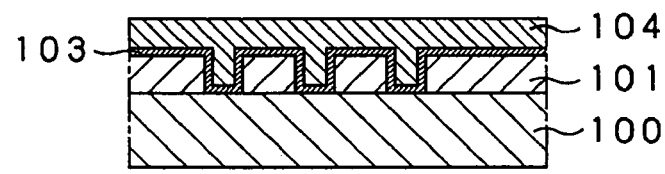
Figure 16F:
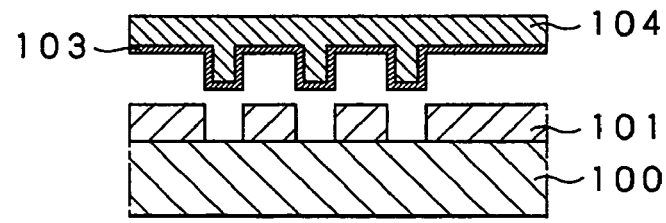

In the step 5, shown in FIG. 16E, the glass master disc 100 is set in a plating unit for electroforming by nickel typing to deposit an electroformed layer 104 on the electrically conductive film 103. The method then proceeds to a step 6 shown in FIG. 16F. In the step 6, shown in FIG. 16F, the electroformed layer 104, having the resist pattern transcribed thereto, is peeled off from the glass master disc 100. The method then proceeds to a step 7 shown in FIG. 16G.

Figure 16G:
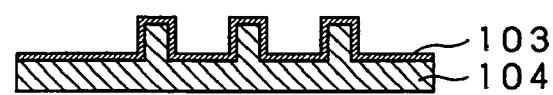

In the step 7, shown in FIG. 16G, the photoresist film 101, deposited on the electroformed layer 104, is removed, and the electroformed layer 104 is machined to a preset shape. A stamper is completed by the step 1 shown in FIG. 16A through the step 7 shown in FIG. 16G. By mounting the stamper to a metal die of an injection molding machine and pressing the stamper against the substrate 80, such as a substrate of resin, e.g. polycarbonate, a preset guide pattern is formed on the substrate 80.

The first producing unit 70 forms an organic dye layer 81, changed responsive to a preset heat quantity, on the substrate 80, carrying the preset guide groove pattern, as described above. The first producing unit 70 also forms a semi-reflective layer 82, partially reflecting and partially transmitting the incident light, on the organic dye layer 81, and a protective layer 83 on the semi-reflective layer 82, to produce the first recording layer 84. The method of forming the second recording layer 90 by the second producing unit 71 is similar to the above-described method and hence is not explained in detail. Meanwhile, the second producing unit 71 forms the organic dye layer 87 changed with the heat quantity different from that of the first recording layer 84, on the substrate 86 carrying the preset guide groove pattern, to produce the second recording layer 90.

The third producing unit 72 causes a mask member, carrying a preset light condensing pattern, to be deposited on the substrate to produce the lens layer 85.

The fourth producing unit 73 executes the processing of bonding the first recording layer 84, produced in the first producing unit 70, the lens layer 85, produced in the third producing unit 72, and the second recording layer 90, produced in the second producing unit 71, to one another. Meanwhile, it is assumed that a temperature T2 at which the organic dye layer 87 formed on the second recording layer 90 is changed is higher than a temperature T1 at which the organic dye layer 81 formed on the first recording layer 84 is changed (T1<T2). Meanwhile, if the light falls on a site where the organic dye layer 81 or the organic dye layer 87 has been changed, the transmission factor of the layer is changed by light scattering or absorption.

With the above-described optical disc manufacturing apparatus 4, having the first producing unit 70 for producing the first recording layer 84, the second producing unit 71 for producing the second recording layer 90, the third producing unit 72 for producing the lens layer 85 and the fourth producing unit 73 for bonding the first recording layer 84, second recording layer 90 and the lens layer 85 together, it is possible to produce an optical disc 5 including the first recording layer 84, having a preset guide groove formed therein, and carrying the organic dye layer 81 and the semi-reflective layer 82, the lens layer 85, and the second recording layer 90, having a preset guide groove formed therein, and carrying the organic dye layer 87 and the reflective layer 88, with the first recording layer 84 and the second recording layer 90 layered together, as shown in FIG. 15.

Figure 17:
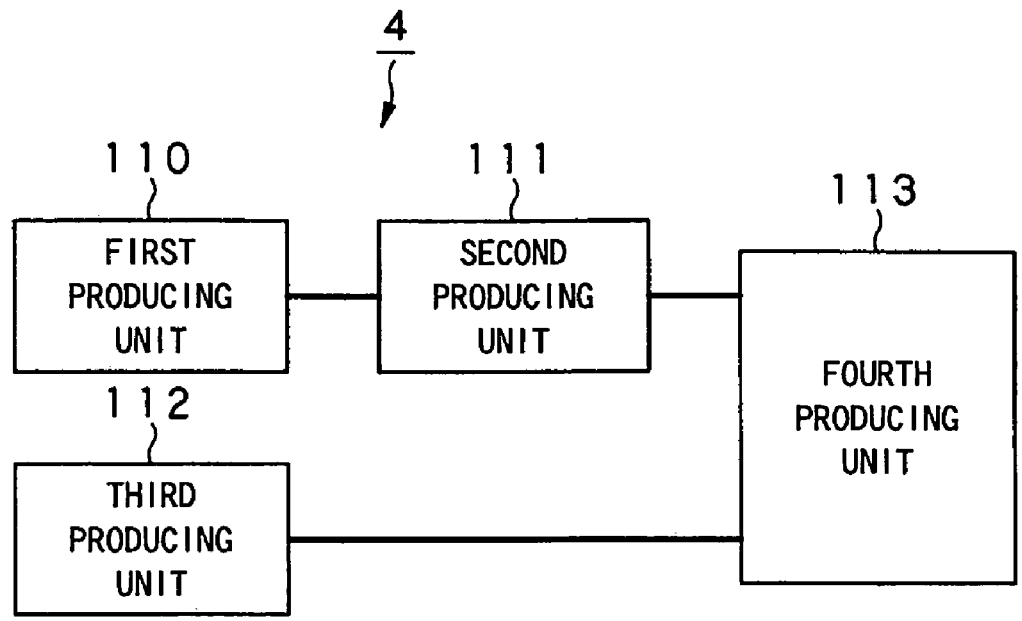
FIG. 17 is a block diagram showing a fifth illustrative structure of an optical disc manufacturing apparatus according to the present invention.

Meanwhile, the optical disc manufacturing apparatus 4 according to the present invention, that is capable of producing the optical disc 5 having the structure as shown in FIG. 15, will do, and is not limited to the present embodiment. Thus, the optical disc manufacturing apparatus 4 may be comprised of a first producing unit 110, for producing the first recording layer 84, a second producing unit 111 for forming the lens layer 85 on the first recording layer 84, a third producing unit 112 for forming the second recording layer 90, and a fourth producing unit 113 for bonding the first recording layer 84 and the second recording layer 90 together, as shown for example in FIG. 17. The first recording layer 84 is made up of the organic dye layer 81, changed responsive to a preset heat quantity, the semi-reflective layer 82, partially reflecting and partially transmitting the incident light, the protective layer 83 for protecting the semi-reflective layer 82 and the substrate 80, carrying a guide groove pattern and the layers 81 to 83. The lens layer 85 condenses the light transmitted through the first recording layer 84 produced by the first producing unit 110 to the second recording layer 90. The second recording layer 90 is made up of the organic dye layer 87, changed with the heat quantity different from that of the organic dye layer 81, the reflective layer 88, reflecting the incident light, the protective layer 89 for protecting the reflective layer 88 and the substrate 86 carrying a guide groove pattern and the layers 87 to 89.

Figure 18:
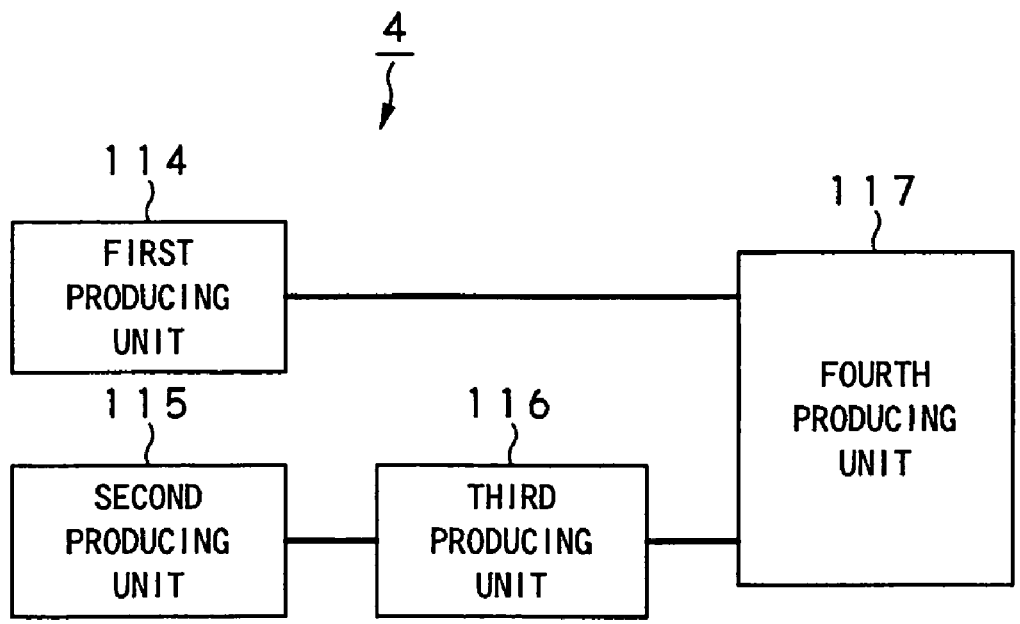
FIG. 18 is a block diagram showing a sixth illustrative structure of an optical disc manufacturing apparatus according to the present invention.

The optical disc manufacturing apparatus 4 may also be comprised of a first producing unit 114, for producing the first recording layer 84, a second producing unit 115 for forming the second recording layer 90, a third producing unit 116 for forming the lens layer 85 on the second recording layer produced by the second producing unit 115, and a fourth producing unit 117, for bonding the first recording layer 84 and the second recording layer 90 together, as shown for example in FIG. 18. The first recording layer 84 is made up of the organic dye layer 81, changed responsive to a preset heat quantity, the semi-reflective layer 82, partially reflecting and partially transmitting the incident light, the protective layer 83 for protecting the semi-reflective layer 82 and the substrate 80, carrying a guide groove pattern and the layers 81 to 83. The second recording layer 90 is made up of the organic dye layer 87, changed with a heat quantity different from that of the organic dye layer 81, the reflective layer 88, reflecting the incident light, the protective layer 89 for protecting the reflective layer 88 and the substrate 86 carrying a guide groove pattern and the layers 87 to 89. The lens layer 85 condenses the light incident on the first recording layer 84 to the second recording layer 90.

The optical disc 5 according to the present invention is a post-recording optical disc in which preset data can be recorded on the first recording layer 84 and on the second recording layer 90 subject to illumination of preset recording light.

Figure 19:
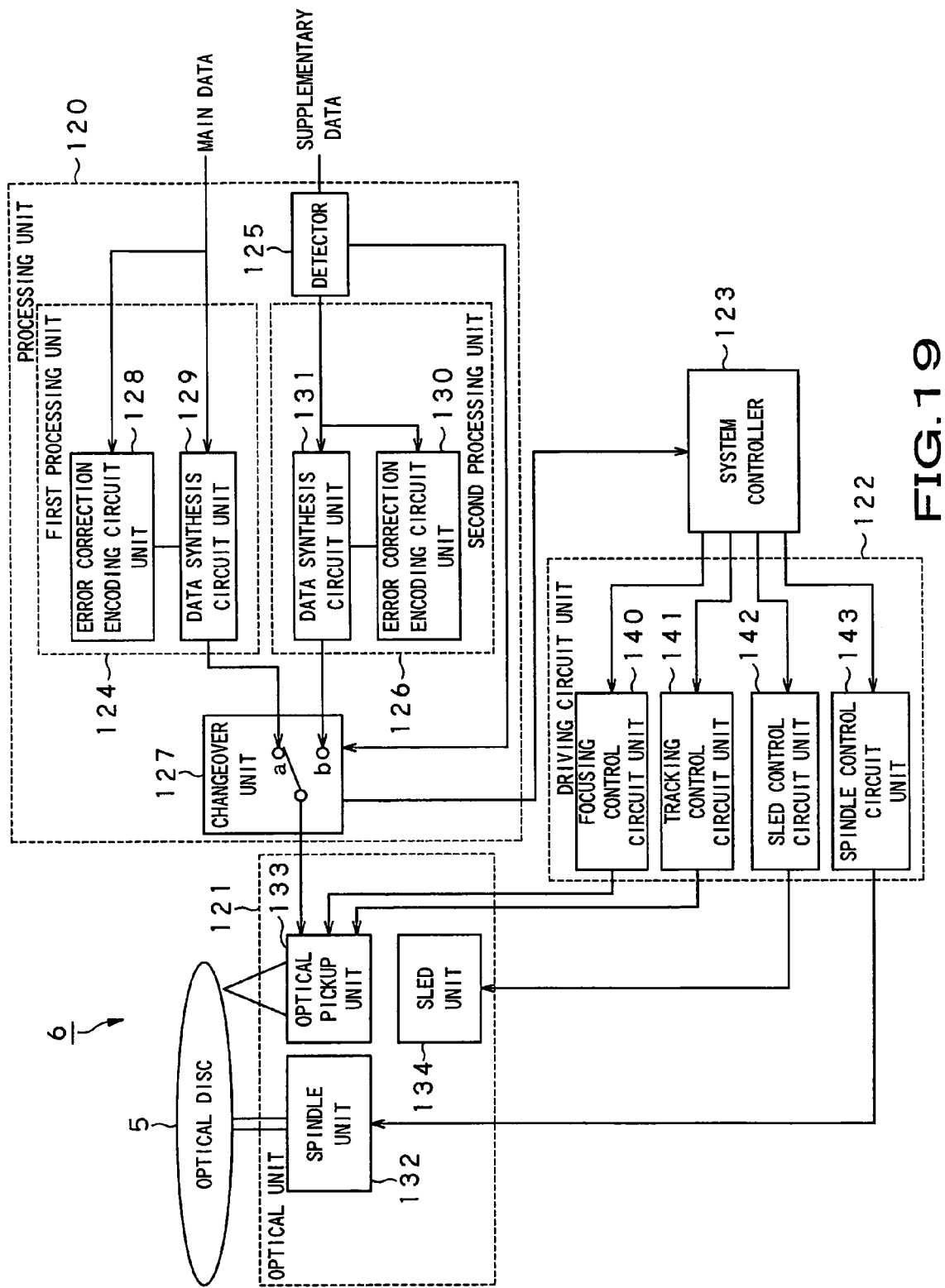
FIG. 19 is a block diagram showing a structure of an optical disc recording apparatus according to the present invention.

The method for recording data on the optical disc 5, manufactured as described above, is hereinafter explained. An optical disc recording apparatus 6 for recording data on the optical disc 5 is made up of a processing unit 120 supplied with data and performing preset processing thereon, an optical unit 121 for writing data processed by the processing unit 120 on the optical disc 5, a driving circuit unit 122 for driving the optical unit 121, and a system controller 123 for controlling the driving circuit unit 122, based on data supplied from the processing unit 120, as shown in FIG. 19.

The processing unit 120 includes a first processing unit 124 for performing preset processing on main data, a detector 125 for detecting that supplementary data (that is, supplementary data to the main data) has been supplied, a second processing unit 126 for performing preset processing on the supplementary data, and a changeover unit 127, to which the first processing unit 124 and the second processing unit 126 are connected and which is adapted for switching between the main data output from the first processing unit 124 and the supplementary data output from the second processing unit 126 responsive to the results of detection by the detector 125. The first processing unit 124 includes an error correction encoding circuit unit 128 for encoding the main data for error correction to generate preset data, and a data synthesis circuit unit 129 for synthesizing the main data to data generated by the error correction encoding circuit unit 128 for generating data for recording. The second processing unit 126 includes an error correction encoding circuit unit 130 for encoding the supplementary data for error correction to generate preset data, and a data synthesis circuit unit 131 for synthesizing the supplementary data to data generated by the error correction encoding circuit unit 130 for generating data for recording.

The changeover unit 127 is responsive to the detected results from the detector 125 to switch between contacts of terminals a and b. On acquisition of the information that no supplementary data has been supplied from the detector 125, the changeover unit 127 switches the contact to the terminal a. On acquisition of the information that the supplementary data has been supplied from the detector 125, the changeover unit 127 alternately switches between the terminals a and b at a preset timing. The changeover unit 127 also sends the information of the terminal then in circuit to the system controller 123.

Figure 20:
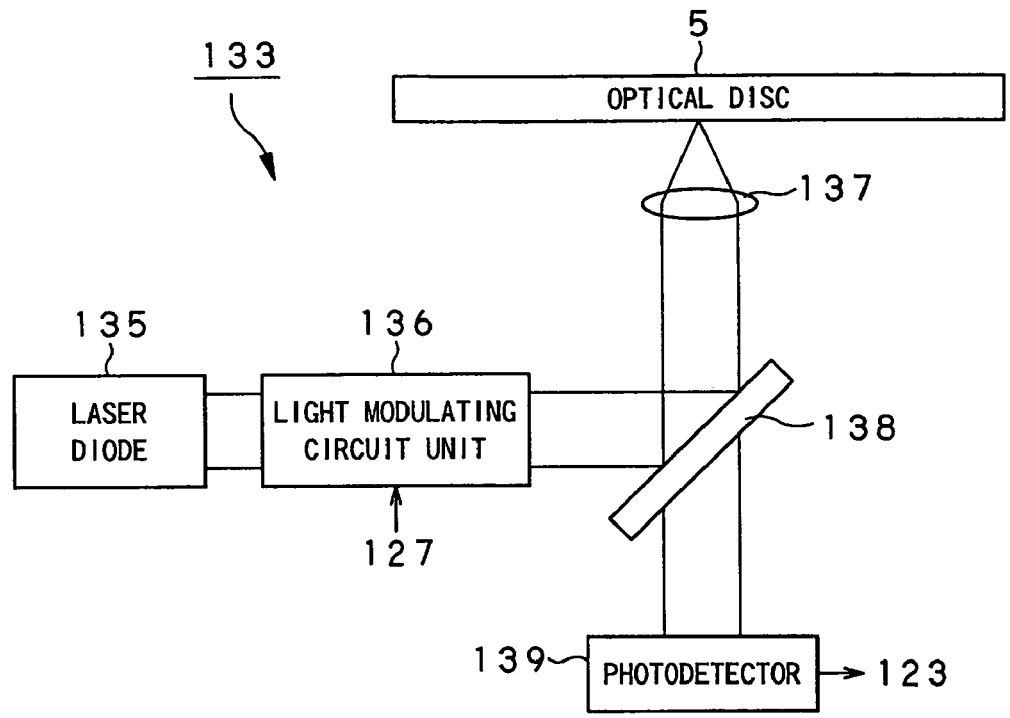
FIG. 20 is a block diagram showing the structure of an optical pickup unit provided to the optical disc recording apparatus shown in FIG. 19.

The optical unit 121 includes a spindle unit 132 for rotationally driving the optical disc 5, an optical pickup unit 133 for illuminating the recording light on the optical disc 5, and a sled unit 134 for sled driving the optical pickup unit 133. Referring to FIG. 20, the optical pickup unit 133 includes a laser diode 135, as a light source, a light modulating circuit unit 136 for modulating the light radiated from the laser diode 135 (recording light) based on data supplied from the processing unit 120, an objective lens 137 for condensing the recording light supplied from the light modulating circuit unit 136 on the optical disc 5, a beam splitter 138 for separating the reproducing light radiated from the laser diode 135 and the return light (reflected light) from the optical disc 5 from each other, and a photodetector 139 for receiving the reflected light from the optical disc 5 for detecting the signal. The optical pickup unit 133 is provided with an optical system for illuminating the reproducing light through the objective lens 137 onto the recording surface of the optical disc 5 and an optical system for guiding the reflected light to the photodetector 139. The objective lens 137 is carried by a biaxial mechanism for movement along the tracking direction (in-plane direction of the optical disc 5) and in the focusing direction (vertical direction to the optical disc 5). The optical pickup unit 133 is movable in its entirety by the sled unit 134 along the radial direction of the optical disc 5.

The driving circuit unit 122 includes a focusing control circuit unit 140 for generating focusing driving signals, based on focusing error signals (referred to below as FE signals) and for supplying the so generated focusing driving signals to the optical pickup unit 133, a tracking control circuit unit 141 for generating tracking driving signals, based on tracking error signals (referred to below as TE signals) and for supplying the so generated tracking driving signals to the optical pickup unit 133, a sled control circuit unit 142 for generating sled driving signals for controlling the operation of the sled unit 134, and a spindle control circuit 143 for generating spindle driving signals based on the spindle error signals and the spindle kick/braking signals supplied from the system controller 123. Meanwhile, the FE signals are focusing driving signals, generated e.g. by the astigmatic method, while the TE signals are tracking driving signals generated e.g. by the three-beam method or the push-pull method along the guide groove pattern formed in the substrate.

The system controller 123 controls the driving circuit unit 122 based on signals supplied from the optical unit 121 and from the processing unit 120.

Figure 21:
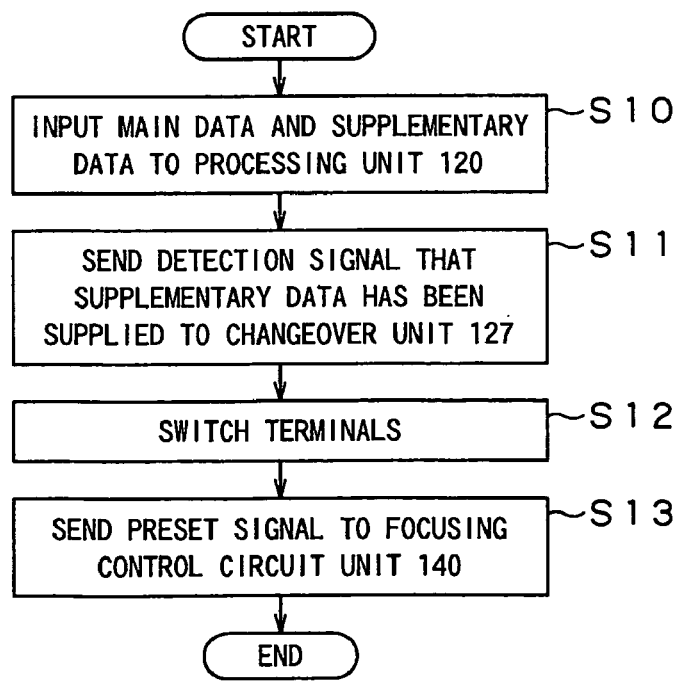
FIG. 21 is a flowchart showing the operation in recording data on the optical disc by the optical disc recording apparatus shown in FIG. 19.

The operation of recording data on the optical disc 5 by the optical disc recording apparatus 6 according to the present invention is now explained by referring to the flowchart shown in FIG. 21. The main data and the supplementary data are supplied to the processing unit 120 (step S10). The detector 125 sends a detection signal that the supplementary data has been supplied to the changeover unit 127 (step S11). The changeover unit 127 changes over the contacts to the terminal a, to be supplied with main data, and to the terminal b, to be supplied with the supplementary data, at a preset timing (step S12). The changeover unit 127 also sends the information on the selected terminal to the system controller 123.

Figure 22:
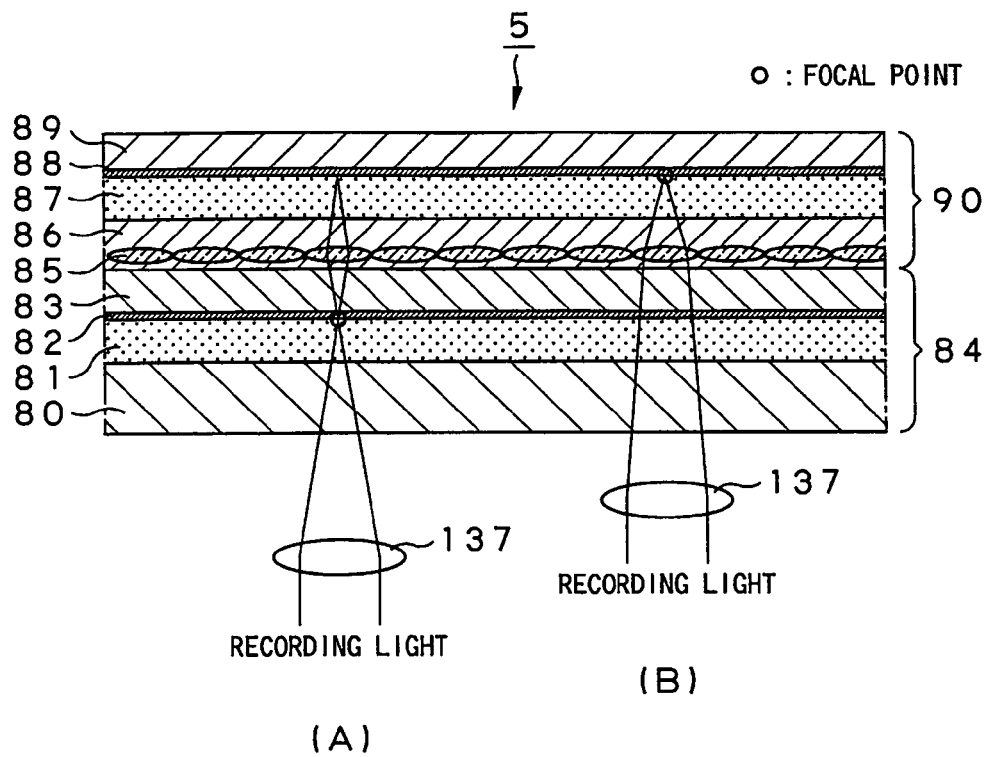
FIG. 22(A) is a schematic cross-sectional view showing how data is recorded on the first recording layer of the optical disc by the optical disc recording apparatus shown in FIG. 19
FIG. 22(B) is a schematic cross-sectional view showing how data is recorded on the second recording layer of the optical disc by the optical disc recording apparatus shown in FIG. 19.

Based on the information supplied from the changeover unit 127, the system controller 123 sends a preset signal to the focusing control circuit unit 140 (step S13). When the main data has been selected by the changeover unit 127 (terminal a side), the system controller 123 sends a first system signal to the focusing control circuit unit 140. The focusing control circuit unit 140 controls the focusing position of the objective lens 137 based on the first system signal supplied from the system controller 123, as shown in FIG. 22(A). The organic dye layer 81, formed in the first recording layer 84, is illuminated by the recording light via the objective lens 137, controlled for focusing to a position shown in FIG. 22(A). When the recording light is focused on the organic dye layer 81, which then is raised to a preset temperature, the organic dye layer is changed, that is, a recording mark is formed. It is noted that, in FIG. 22(A), the light transmitted through the first recording layer 84 is also focused, through the lens layer 85, on the second recording layer 90. However, since the organic dye layer 87 is of a material changed at a temperature higher than in the case of the organic dye layer 81, it is possible to change only the organic dye layer 81 by controlling the illuminating time of the recording light.

Meanwhile, when the supplementary data has been selected in the changeover unit 127 (terminal b side), the system controller 123 sends a second system signal to the focusing control circuit unit 140. The focusing control circuit unit 140 controls the focusing position of the objective lens 137, based on the second system signal, supplied from the system controller 123, as shown in FIG. 22(B). The organic dye layer 87, formed in the second recording layer 90, is illuminated by the recording light via the objective lens 137, controlled for focusing to a position shown in FIG. 22(B). When the recording light is focused on the organic dye layer 87, which then is raised to a preset temperature, the organic dye layer is changed, that is, a recording mark is formed.

For example, the main data, such as images or speech, are recorded in the first recording layer 84 of the optical disc 5, while the supplementary data for raising the quality of the main data is recorded in the second recording layer 90.

When data is recorded on the post recording optical disc 5, composed of the first recording layer 84, carrying the organic dye layer 81 changed responsive to the preset heat quantity, and the semi-reflective layer 82, partially reflecting and partially transmitting the incident light, and the second recording layer 90, bonded to the first recording layer, and carrying the lens layer 85 for condensing the light transmitted through the first recording layer 84 to the second recording layer 90, the organic dye layer 87 changed responsive to a heat quantity different from that in the organic dye layer 81 formed in the first recording layer 84, and the reflective layer 88 reflecting the incident light, the optical disc recording apparatus 6 performs preset focusing control on the objective lens 137, depending on the recording layer recording the data, and illuminates the recording light through the objective lens 137, so that only the organic dye layer of the desired recording layer can be changed to record the desired data by such change in the organic dye layer.

The basic structure and method for reading out data from the optical disc 5, on which the data has been recorded by the optical disc recording apparatus 6, are the same as those for the optical disc reproducing apparatus 3, and hence are not explained in detail.

Figure 23:
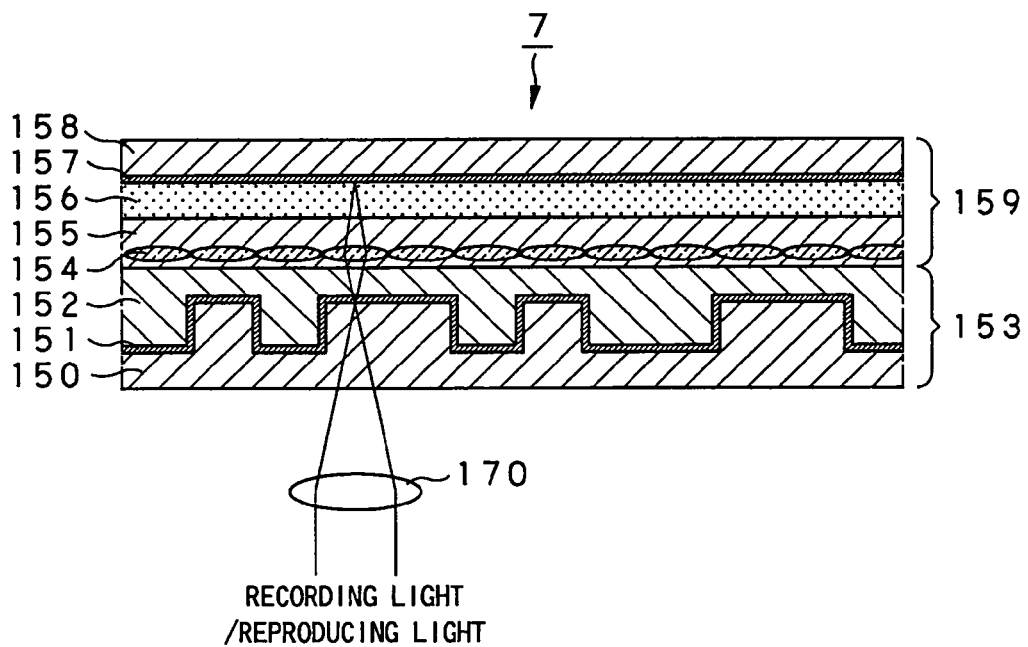
FIG. 23 is a cross-sectional view showing an illustrative structure of an optical disc according to the present invention.

The optical disc manufacturing apparatus may be an apparatus for manufacturing an optical disc of the hybrid type comprised of the optical disc 2 manufactured by the optical disc manufacturing apparatus 1 and the optical disc 5 manufactured by the optical disc manufacturing apparatus 4. An optical disc 7, manufactured by this optical disc manufacturing apparatus, is made up by a first recording layer 153 and a second recording layer 159, bonded together, as shown in FIG. 23. The first recording layer 153 is made up by a substrate 150, carrying a recording pattern derived from the main data, a semi-reflective layer 151, formed on the substrate, and a protective layer 152, similarly formed on the substrate. The second recording layer 159 is made up by a lens layer 154 for condensing the light transmitted through the first recording layer 153 to the second recording layer 159, a substrate 155 having a preset guide groove formed thereon, an organic dye layer 156, changed responsive to a preset heat quantity, a reflective layer 157 for reflecting the incident light and a protective layer 158 for protecting the reflective layer 157. When data is to be recorded on this optical disc 7, the recording light is illuminated via an objective lens 170, controlled as to focusing in a preset manner, to induce changes in the organic dye layer 156 to record desired data by such change in the organic dye layer.

The above-described optical disc 7 may be utilized as follows: An image of the SD level (main data) is recorded in advance in the first recording layer 153 of the optical disc 7 and distributed to a user at a low cost. Responsive to the user's request, an additional fee is collected from the user and supplementary data which raises the level of the main data to a HD level is recorded in the second recording layer.

Figure 24:
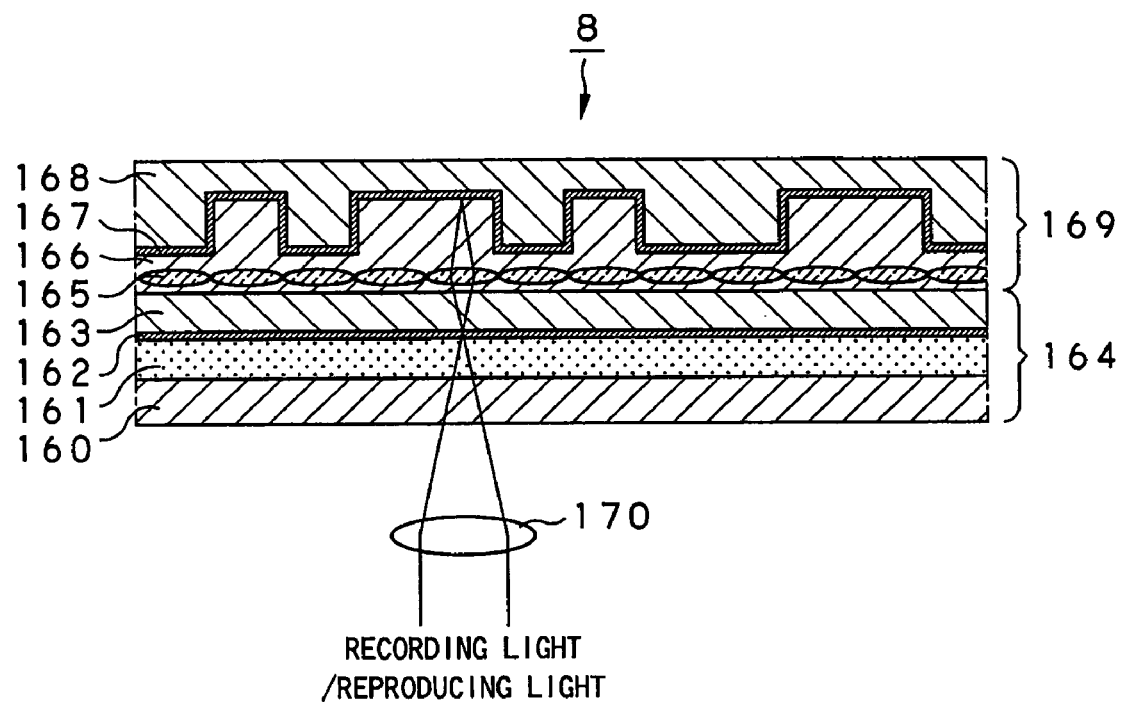
FIG. 24 is a cross-sectional view showing another illustrative structure of an optical disc according to the present invention.

An optical disc 8, manufactured by an optical disc manufacturing apparatus according to the present invention, may be comprised of a first recording layer 164 and a second recording layer 169, bonded together, as shown in FIG. 24. The first recording layer 164 is made up by an organic dye layer 161, changed responsive to a preset heat quantity, with a preset guide groove formed in a substrate 160, a semi-reflective layer 162, partially reflecting and partially transmitting the incident light, and a protective layer 163 for protecting the semi-reflective layer 162, whilst the second recording layer 169 is made up by a lens layer 165 for condensing the light transmitted through the first recording layer 164 to the second recording layer 169, a substrate 166 carrying a recording pattern derived from the main data, a reflective layer 167 and a protective layer 168. In recording data on this optical disc 8, the recording light is illuminated via objective lens 170, controlled as to focusing in a preset manner, to induce changes in the organic dye layer 161 to record desired data by such changes in the organic dye layer.

The present invention is not limited to the embodiments described with reference to the drawings and, as may be apparent to those skilled in the art, various changes, substitutions or equivalents may be envisaged without departing from the spirit and scope of the invention as defined in the appended claims.

INDUSTRIAL APPLICABILITY

The optical disc manufacturing apparatus according to the present invention, described above, includes a first producing unit for producing a first recording layer, composed of a semi-reflective layer, partially reflecting and partially transmitting the incident light, and a substrate carrying the semi-reflective layer, a second producing unit for producing a second recording layer, composed of a reflecting layer reflecting the incident light, and another substrate carrying the reflecting layer, a third producing unit for producing a light condensing layer for condensing the light transmitted through the first recording layer to the second recording layer, and a fourth producing unit for bonding the first recording layer, the light condensing layer and the second recording layer to one another. Thus, it is possible to produce an optical recording medium having the first recording layer, having the main data recorded thereon and carrying the semi-reflective layer, the light condensing layer, and the second recording layer, having the supplementary data recorded thereon and carrying the reflecting layer, and an optical recording medium having the first recording layer, carrying a preset guide groove, a recording material and a semi-reflective layer, a light condensing layer, and a second recording layer carrying a preset guide groove and having formed thereon the recording material and the reflective layer.

The method for manufacturing the optical recording medium according to the present invention, described above, includes a first producing step of producing a first recording layer, composed of a semi-reflective layer, partially reflecting and partially transmitting the incident light, and a substrate carrying the semi-reflective layer, a second producing step of producing a second recording layer, composed of a reflecting layer reflecting the incident light, and another substrate carrying the reflecting layer, a third producing step of producing a light condensing layer for condensing the light transmitted through the first recording layer to the second recording layer, and a fourth producing step of bonding the first recording layer, the light condensing layer and the second recording layer. Thus, it is possible to produce an optical recording medium having the first recording layer, having the main data recorded thereon and carrying the semi-reflecting layer, the light condensing layer, and the second recording layer, having the supplementary data recorded thereon and carrying the reflecting layer, and an optical recording medium having the first recording layer, carrying a preset guide groove, a recording material and a semi-reflective layer, a light condensing layer, and a second recording layer carrying a preset guide groove and having formed thereon the recording material and the reflective layer.

The optical recording medium according to the present invention, described above, includes a first recording layer, composed of a semi-reflective layer for partially reflecting and partially transmitting the incident light, and a substrate carrying the semi-reflective layer, a second recording layer, composed of a reflecting layer for reflecting the incident light, and another substrate carrying the reflecting layer, and a light condensing layer for condensing the light transmitted through the first recording layer to the second recording layer. Thus, in case the main data is recorded at the outset in the first recording layer and the supplementary data is recorded in the second recording layer at the outset, the main data and the supplementary data appended thereto may be exploited as being readable data. Moreover, in case an organic dye material, changed with the preset heat quantity, is formed in the first recording layer, and another organic dye material, changed with the heat quantity different than the preset heat quantity, is formed in the second recording layer, the supplementary data as well as the main data may be utilized as being writable data.

The reproducing apparatus according to the present invention, described above, includes an illuminating unit for illuminating the reproducing light on the optical recording medium, having a first recording layer, composed of a semi-reflective layer for partially reflecting and partially transmitting the incident light, and a substrate carrying the semi-reflective layer, a second recording layer, composed of a reflecting layer for reflecting the incident light, and another substrate carrying the reflecting layer, and a light condensing layer for condensing the light transmitted through the first recording layer to the second recording layer, and a detection unit for detecting the reflected light from the optical recording medium in plural stages depending on the light intensity. Thus, the superposed light, composed of the reproducing light incident on the first recording layer and reflected by the semi-reflective layer, and the light transmitted through the semi-reflective layer, condensed on the second recording layer through the lens layer and reflected by the reflecting layer, can be detected in plural stages in dependence on the light intensity, such that it is possible to append the supplementary data recorded in the second recording layer to the main data recorded in the first recording layer and to reproduce the resulting data.

The reproducing method according to the present invention, described above, illuminates the reproducing light on the optical recording medium, having a first recording layer, composed of a semi-reflective layer for partially reflecting and partially transmitting the incident light, and a substrate carrying the semi-reflective layer, a second recording layer, composed of a reflecting layer for reflecting the incident light, and another substrate carrying the reflecting layer, and a light condensing layer for condensing the light transmitted through the first recording layer to the second recording layer, and detects the reflected light from the optical recording medium in plural stages depending on the light intensity. Thus, the superposed light, composed of the reproducing light incident on the first recording layer and reflected by the semi-reflective layer and the light transmitted through the semi-reflective layer, condensed on the second recording layer through the lens layer and reflected by the reflecting layer, can be detected in plural stages in dependence on the light intensity, such that it is possible to append the supplementary data recorded in the second recording layer to the main data recorded in the first recording layer and to reproduce the resulting data.

The recording apparatus according to the present invention includes an illuminating unit for illuminating the reproducing light on the optical recording medium, having a first recording layer, composed of a semi-reflective layer for partially reflecting and partially transmitting the incident light, and a substrate carrying the semi-reflective layer, a second recording layer, composed of a reflecting layer for reflecting the incident light, and another substrate carrying the reflecting layer, and a light condensing layer for condensing the light transmitted through the first recording layer to the second recording layer, an objective lens for condensing the recording light on the optical recording medium, and a focusing controlling unit for controlling the focusing position of the objective lens, more specifically, for controlling the focusing position of the objective lens condensing the recording light on the recording medium, for each of the recording layers in which to record the data. The first recording layer of the optical recording medium is composed of an organic dye material, changed responsive to a preset heat quantity, and a substrate carrying the organic dye material, while the second recording layer is composed of another organic dye material, changed responsive to a heat quantity, different than the preset heat quantity, and another substrate carrying the organic dye material. Thus, it is possible to induce changes only in the organic dye material of the desired recording layer, and hence it is possible to record main data in the first recording layer and to record the supplementary data in the second recording layer.

In the recording method according to the present invention described above, when data is recorded on an optical recording medium, the focusing position of the objective lens, that collects the recording light to the optical recording medium, is controlled depending on the recording layer to which data is to be recorded. The optical recording medium includes a first recording layer, composed of a semi-reflective layer for partially reflecting and partially transmitting the incident light, and a substrate carrying the semi-reflective layer, a second recording layer, composed of a reflecting layer for reflecting the incident light, and another substrate carrying the reflecting layer, and a light condensing layer for condensing the light transmitted through the first recording layer to the second recording layer. The first recording layer includes an organic dye material, changed responsive to a preset heat quantity, and which is carried by the first-stated substrate, while the second recording layer includes another organic dye material, changed responsive to a heat quantity, different than the preset heat quantity, and which is carried by the second-stated substrate. Thus, it is possible to induce changes only in the organic dye material of the desired recording layer, and hence it is possible to record main data in the first recording layer and to record the supplementary data in the second recording layer.

The invention claimed is:

1. A recording apparatus comprising recording light illuminating means for illuminating recording light on an optical recording medium having a plurality of recording layers, said optical recording medium including a n-th (n≧1) recording layer at least having a substrate and a semi-reflective layer for partially reflecting and partially transmitting the incident light, formed on said substrate, a (n+1)th recording layer at least having another substrate and a reflecting layer for reflecting the light, incident thereon, formed on said another substrate, and a light condensing layer for collecting the light incident through said n-th recording layer on said (n+1)th recording layer;

an objective lens for condensing the recording light illuminated by said recording light illuminating means on said optical recording medium; and focusing control means for controlling the focusing of said objective lens;

said focusing control means, in recording data on an n-th recording layer of said recording medium, controlling the focusing position of said objective lens so that the light will be focused on the organic dye material formed on the n-tb recording layer; said focusing control means, in recording data on an (n+1)th recording layer of said recording medium, controlling the focusing position of said objective lens so that the light will be focused on the organic dye material formed on said (n+1)th recording layer through said light condensing layer.

2. The recording apparatus according to claim 1, comprising first error correction code generating means for generating an error correction code based on main data;

first synthesizing means for synthesizing the error correction code generated by said first error correction code generating means to said main data;

second error correction code generating means for generating an error correction code derived from supplementary data relevant to said main data;

second synthesizing means for synthesizing the error correction code, generated by said second error correction code generating means, to said supplementary data;

first modulating means for modulating the recording light, illuminated by said recording light illuminating means, based on data obtained on synthesis by said first synthesizing means; and second modulating means for modulating the recording light, illuminated by said recording light illuminating means, based on data obtained on synthesis by said second synthesizing means; wherein said main data are recorded by the recording light modulated by said first modulating means becoming illuminated on said n-th recording layer via an objective lens controlled as to focusing by said focusing controlling means, and wherein said supplementary data are recorded by the recording light modulated by said second modulating means becoming illuminated on said (n+1)th recording layer via said objective lens controlled as to focusing by said focusing controlling means.

3. A recording method for recording data on an optical recording medium having a plurality of recording layers, said optical recording medium at least having an n-th recording layer (n≧1), made up by a substrate and a semi-reflective layer carried by said substrate and adapted for partially reflecting and partially transmitting the light incident thereon, a (n+1)th recording layer, made up by another substrate and a reflective layer carried by said another substrate and adapted for reflecting the light incident thereon, and a light condensing layer for condensing the light incident via said n-th recording layer on said (n+1)th recording layer, said n-th recording layer including an organic dye material, carried by said substrate, and adapted for being changed responsive to a preset heat quantity, said (n+1)th recording layer including an organic dye material, carried by said another substrate, and adapted for being changed responsive to a heat quantity different than said preset heat quantity, wherein when data is recorded on said n-th recording layer of said optical recording medium, the focusing position of said objective lens is controlled so that the light will be focused on said organic dye material formed on said n-th recording layer; and when data is recorded on said (n+1)th recording layer of said optical recording medium, the focusing position of said objective lens is controlled so that the light will be focused on said organic dye material formed on said (n+1)th recording layer.

* * * * *